US006493334B1

(12) United States Patent
Krzymien et al.

(10) Patent No.: US 6,493,334 B1
(45) Date of Patent: Dec. 10, 2002

(54) SPREAD SPECTRUM TIME-DIVISION MULTIPLE ACCESS COMMUNICATION SCHEME

(75) Inventors: Witold A. Krzymien, Edmonton (CA); Songsong Sun, Irving, TX (US)

(73) Assignee: Telecommunications Research Laboratories, Alberta (CA)

( * ) Notice: Subject to any disclaimer, the term of this patent is extended or adjusted under 35 U.S.C. 154(b) by 0 days.

(21) Appl. No.: 09/352,261

(22) Filed: Jul. 13, 1999

(30) Foreign Application Priority Data

May 26, 1999 (CA) ............................................ 2272875

(51) Int. Cl.[7] ............................................... H04B 7/216

(52) U.S. Cl. ....................... 370/342; 370/324; 370/335; 370/350; 370/442

(58) Field of Search ................................ 370/320, 321, 370/324, 335, 336, 337, 342, 345, 347, 348, 349, 350, 441, 442, 458

(56) References Cited

U.S. PATENT DOCUMENTS

| | | | | | |
|---|---|---|---|---|---|
| 4,398,289 | A | * | 8/1983 | Schoute | 370/458 |
| 5,189,411 | A | * | 2/1993 | Collar et al. | 370/350 |
| 5,189,670 | A | * | 2/1993 | Inglis | 370/349 |
| 5,245,612 | A | * | 9/1993 | Kachi et al. | 370/324 |
| 5,537,397 | A | | 7/1996 | Abramson | 370/18 |
| 5,555,266 | A | * | 9/1996 | Buchholz et al. | 370/347 |
| 5,917,813 | A | * | 6/1999 | Van Driel et al. | 370/348 |

OTHER PUBLICATIONS

International Telecommunication Union, Radio Communication Study Groups, TR45.5., "The CDMA2000 ITU–R RTT Candidate Submission", Jun. 1998, 114 pages.

TIA/EIA IS–95, Mobile station—base station compatibility standard for dual–mode wideband spread spectrum cellular system, Telecommunications Industry Association, 1993, p. 6–29, 6–30, 6–88–6–96.

Spread spectrum Communications Handbook, Marvin K. Simon, Jim K. Omura, Robert A. Scholtz and Barry K. Levitt, revised edition, McGraw–Hill, 1994, Chapter 1, p. 751–900.

Introduction to Spread–Spectrum Communications, Roger L. Peterson, Rodger E. Ziemer and David E. Borth, Prentice Hall, New Jersey, 1995, Chapter 5, Initial Synchronization of the Receiver Spreading Code, p. 221–315.

Digital Communications, 3rd Edition, McGraw–Hill, New York, 1995, J.G. Proakis, Chapter 2, Probability and Stochastic Processes, p. 41–48.

Probability and Random Processes for Electrical Engineering, Second Edition, Addison–Wesley Publishing Company, Reading, Mass., 1994, Alberto Leon–Garcia, Chapter 3, Random Variables, p. 106–110.

(List continued on next page.)

*Primary Examiner*—Nay Maung
*Assistant Examiner*—Quochien B. Vuong
(74) *Attorney, Agent, or Firm*—Stallman & Pollock LLP

(57) ABSTRACT

A new DTX-MAC protocol is proposed for a cellular radio telecommunications system with many users. Several users are allowed to transmit packets within a time-slotted frame structure. Direct sequence spread spectrum technique is used to spread the packets, and all packets within the frame are spread using the same spreading sequence. The packets overlap, but each packet begins within a distinct slot of the frame. Each slot, or mini-slot, since it is much shorter than the packet, is dedicated to one of the mobile terminal users. Collisions between packets are prevented by appropriate selection of the duration of the mini-slot. Packets may be ARMs, user data, or both. A packet beginning within a mini-slot is assumed to be from the mobile terminal to which that mini-slot is dedicated

20 Claims, 17 Drawing Sheets

OTHER PUBLICATIONS

Open Multi–Rate Radio Interface Architecture Based on CDMA, Alfred Baier, in Proc. ICUPC'93, Ottawa, Canada, Oct. 1993, IEEE, p. 985–989.

The Throughput of Packet Broadcasting Channels, Norman Abramson, IEEE Transactions on Communications, vol. Com–25, No. 1, Jan. 1977, p. 117–128.

Wideband Random Access for the Last Mile, Norman Abramson, Aloha Networks, Inc. IEEE Personal Communications, Dec. 1996, p. 29–33.

Packet Switching in Radio Channels: Part I—Carrier Sense Multiple–Access Modes and Their Throughput–Delay Characteristics, Leonard Kleinrock, Fouad A Tobagi, IEEE Transactions on Communications, vol. Com–23, No. 12, Dec. 1975, p. 1400–1416. Packet Switching in Radio Channels: Part II—The Hidden Terminal Problem in Carrier Sense Multiple–Access and the Busy–Tone Solution, Fouad A. Tobagi and Leonard Kleinrock, IEEE Transactions on Communications, vol. Com–23, No. 12, Dec. 1975, p. 1417.

Error Control Systems for Digital Communication and Storage, Prentice–Hall, New Jersey, 1995, Chapter 5, Cyclic Codes, S.B. Wicker, p. 99–127.

Acquisition Time Performance of PN Spread–Spectrum Systems, Jack K. Holmes, Chang C. Chen, IEEE Transactions on Communications, vol. Com–25, No. 8, Aug. 1977, p. 778–783.

A Unified approach to Serial Search Spread–Spectrum Code Acquisition—Part I: General Theory, Andreas Polydoros, Charles L. Weber, IEEE Transactions on Communications, vol. Com–32, No. 5, May, 1984, p. 542–549.

Statistical Performance of Single Dwell Serial Synchronization Systems, David M. Dicarlo, Charles L. Weber, IEEE Transactions on Communications, vol. Com–28, No. 8, Aug. 1980, p. 1382–1388.

Multiple Dwell Serial Search: Performance and Application to Direct Sequence Code Acquisition, David M. Dicarlo, Charles L. Weber, Concise Papers, IEEE Transactions on Communications, vol. Com.31, No. 5, May 1983, p. 650–659.

A Unified Approach to Serial Search Spread–Spectrum Code Acquisition—Part II: A Matched–Filter Receiver, Andreas Polydoros, Charles L. Weber, IEEE Transactions on Communications, vol. Com–32, No. 5 Maya 1984, p. 550–560.

CDMA: Principles of Spread Spectrum Communication, Addison–Wesley, 1995, Andrew J. Viterbi, Chapter Three: Synchronization of Pseudorandom Signals, p. 39–60.

Differential matched filter architecture for spread spectrum communication systems, W.–C. Lin, K.–C. Liu and C.–K. Wang, Electronics Letters, vol. 32, No. 17, Aug. 15, 1996, p. 1539–1540.

Matched Filter Based Synchronizer Design for Rapid Synchronization of Packet Data Transmissions in DS–CDMA Personal Communications Systems, Songsong Sun and Witold A. Krzymien, in Proc. PACRIM'97, Victoria, Canada, Aug., 1997, IEEE, p. 5–8.

Aloha Packet System with and Without Slots and Capture, Lawrence G. Roberts, Comput. Commu. Rev., vol. 5, pp. 28–42, Apr. 1975.

Final Report on RF Channel Characterization, The Joint Technical Committee of Committee TI TIP1.4 and the TIA TR46.3.3/TR45.4.4 on Wireless Access, JTC (AIR)/ 93.09.23–238R2, Sep. 23, 1993, p. 1–38 (p. 20).

Performance Comparison of Two Medium Access Control Schemes for Packet Data Traffic in DS–CDMA Personal Communications Systems, Songsong Sun, Witold Krzymien, Ahmad Jalali, Qiang Shen, Proc. of IEEE Globecom '97/CTMC'97, Phoenix, USA, Nov. 1997, IEEE, p. 185–189.

Evolving GSM Data Services, Chris Scholefield, Proc. of IEEE ICUPC'97, San Diego, Oct. 1997, pp. 888–892.

* cited by examiner

SPREAD SPECTRUM TIME-DIVISION MULTIPLE ACCESS COMMUNICATION SCHEME

FIELD OF THE INVENTION

This invention relates to packet transmission in multiple access communication systems.

BACKGROUND OF THE INVENTION

In this patent document, the references referred to in square brackets, eg [1], are listed at the end of the disclosure.

The 3G CDMA system is supposed to support simultaneous voice/packet data/circuit data operations [1] with different QoS requirements. Since the traffic characteristics and the quality of service requirements for packet data services are quite different from those of voice traffic, system re-design in certain essential aspects is necessary for an integrated voice-data system without impacting voice quality or sacrificing data performance.

Packet-type services are designed for on-off sources, which generate no information during often prolonged, but unpredictable, off intervals. For many data applications the intermittent nature of the traffic is orders of magnitude greater than that of voice signals as shown in FIG. 1. The system capacity can be greatly increased if no signal is transmitted during the off period, since the CDMA system is interference limited.

The efficient provision of packet-type services is particularly difficult on reverse links (from mobile to base station) of CDMA systems, because of the need to rapidly regain synchronization of spreading sequences when the source resumes transmission after a period of silence. One possible solution to the link maintenance problem when bursty transmission is required on reverse links of CDMA systems is to assign a separate low bit rate physical control channel (created using code division multiplex) to each portable in a given cell. This approach, proposed by some investigators [2], can be called a continuous transmission medium access control scheme (CTX-MAC), and it unfortunately causes increased multi-user interference introduced by continuously transmitted maintenance signals. Increased interference naturally leads to reduced traffic capacity. Also its implementation is characterized by significantly increased complexity of base station receivers, where each physical control channel (serving one portable) would require a separate despreading correlator. If the duty cycle (ratio of the on-period to off-period of the mobile's transmitter) as shown in FIG. 1 is small, then considerable savings in both base station hardware and system capacity may be achieved if transmission is discontinued during the off-periods and the hardware is shared among different users. This is the discontinuous transmission medium access control (DTX-MAC) scheme. With the DTX-MAC scheme, when a particular user has a data packet to send, the base station needs to be notified by the mobile of its intention to transmit, and synchronization needs to be quickly resumed. To achieve that an access request message (ARM) is transmitted from the mobile to base station to acquire synchronism, and to inform the base station of the mobile's identity. An access reservation channel (ARC) is allocated for such a purpose. All mobiles in a cell (or sector) use the same PN code to send their ARMs on the ARC; this avoids the need to have a separate receiver for each mobile, even in the off mode. If the number of sources is large, then more than one ARC may be used.

A MAC protocol is required on the ARC for the mobiles to access the base station with individual ARMs. One possible approach is to allow the mobile units to send ARMs in an asynchronous fashion—ADTX-MAC protocol. Another is a synchronous approach—SDTX-MAC protocol, in which a slotted frame structure is used for the access control of ARMs from all users.

Since the user sending a transmission request has already been registered and has acquired synchronization before, the timing ambiguity is mainly caused by the propagation delay uncertainty due to the movement of the mobile in a cell during the silent period. Hence, it is relatively easier to synchronize again than to acquire initial synchronization during the registration phase involving the access channel. On the other hand, the synchronization needs to be regained very quickly so that the arriving data burst can be transmitted without undue delay. Due to these reasons, the specific structure of the IS-95 access channel [3] which is used by the mobile station to initiate communication with the base station and to respond to paging channel messages, is no longer suitable, since its access probe occupies several 20 ms frames in time. Instead, much shorter access request messages are used within the access reservation channel structure significantly different from the IS-95 access channel. Such an approach dramatically reduces access delay and increases throughput.

SDTX-MAC Protocol

In the SDTX-MAC system, a time-slotted frame structure is used to accommodate access requests from different users on the access reservation channel (ARC). Specific time slots in the frame equal in length to the duration of the access request message (if necessary, a small guard time may be added) are assigned by the base station to mobile users after registration (one slot per user). Collision is thus avoided and there is no need of inserting an identifier appendix after the synchronizing part of the ARM. A method of step-increase of power is used for ARMs. After each ARM, the mobile monitors the paging channel for an acknowledgment (ACK) from the base station. If the elapsed time before the ACK is received is longer than the prescribed maximum, the corresponding ARM is regarded as a failure, and next one is sent at a power level increased by a fixed step. For each user, a fixed number of ARMs of increasing powers form an ARM sequence. If the synchronization is still not acquired after the sequence of ARMs is sent, a new sequence is started, with the transmitting power starting from the lowest level. Identical ARM sequences are repeated up to a maximum allowed number of repetitions, which is assumed large enough to ensure acquisition. The synchronism acquired through the ARC may be coarse, but it is sufficiently accurate to receive data packets from the user in question on a dedicated data channel. Each data packet sent on that channel is preceded by a short synchronizing preamble to refine synchronism.

The number of slots in one slotted frame of the access reservation channel (ARC) is designed to accommodate the expected number of registered users in a cell or sector. Once a user is registered, a slot is assigned to him on the ARC, and the base station subsequently uses that assignment to identify a user sending an access request. An example is shown in FIG. 2 wherein there are four slots within one frame, $T_p$, $T_F$ are the slot and frame lengths, respectively, and there are three ARMs within one access message sequence.

ADTX-MAC Protocol

The asynchronous discontinuous transmission medium access control (ADTX-MAC) protocol is in general terms similar to that used in the IS-95 access channel. It is a spread slotted ALOHA [4]–[6] with p-persistence [7] (plus sequence back-off) between ARM sequences. As shown in FIG. 3 a fixed number of ARMs forms an ARM sequence (three ARMs within an ARM sequence in this figure), with the transmission power increasing consecutively by a fixed increment. There is a random back-off $T_R$ between ARMs in the sequence, if the ACK is not received before time-out, $T_A$. If the second ARM sequence is required, there is a random back-off $T_S$ before a p-persistence test, for the next ARM sequence to start. To reduce the probability of collision, the exact transmission time of each user is pseudo-randomly delayed from the slot start time, the delay being known to the base station.

Since all the users use the same PN code to spread their ARMs, each ARM consists of one synchronization preamble and an appendix for user identification. This appendix is designed to have the same length as the preamble, and is block-coded to provide the necessary error protection. The ARM for ADTX-MAC is of twice the length of an ARM in SDTX-MAC protocol.

SDTX-MAC can provide delay characteristics superior to those of the ADTX-MAC, but ADTX-MAC's throughput may be larger or smaller than that of the SDTX-MAC depending on the offered traffic and the selected maximum value of the randomization delay. This is also intuitive, since ADTX-MAC's access request message (ARM) must include an appendix, which increases the access delay. On the other hand, due to PN spreading and randomization procedure, more than one ADTX-MAC's ARM within one time slot can be received successfully without collision, and clearly only one ARM can be transmitted per slot in SDTX-MAC. Even if the time slot is normalized to enable fair comparison, ADTX-MAC may still provide better throughout characteristics. The reason is that, although SDTX-MAC does solve the collision problem, and takes advantage of TDMA structure, it does not take advantage of the interference suppression capabilities of spread spectrum, and thus its performance is not optimal. On the other hand, ADTX-MAC does take advantage of spread spectrum, but it does not solve the potential collision problem.

When the transmitted signal propagates through a multipath fading channel, its replicas will arrive at the receiving end at different times spread over the maximum excess delay interval. If we denote the maximum excess delay expressed in chip intervals by $\tau_M$, it is reasonable to assume that when the temporal separation of signals arriving from different users is larger than ($\tau_M$+1) chip intervals, collisions will not occur. If we assume that the start times of transmitted packets form a Poisson point process with the arrival rate $\lambda$ packets/s, and denote the duration of a packet in seconds as $T_p$, the offered channel traffic G (in packets) will be:

$$G=\lambda T_p$$

The present invention provides for an improved multiple access protocol that improves upon the ADTX-MAC protocol and the SDTX-MAC protocol.

SUMMARY OF THE INVENTION

The limitations in the SDTX-MAC and ADTX-MAC discussed above are addressed by the following invention, which has been called minislotted SDTX-MAC, or M-SDTX-MAC.

Accordingly, there is provided a method of transmitting packets in a telecommunications system. Packets are transmitted from multiple terminals, in which the packets are spread with an identical spreading sequence for each terminal. The packets are transmitted in frames. An aspect of the invention includes allocating a respective mini-slot in each frame to a particular terminal as an identification reference for a packet transmitted from the particular terminal in the respective time slot. Further, at each terminal, packets are transmitted from the terminal beginning at a time within the mini-slot allocated to that terminal, with the packet being longer than the mini-slot.

In one aspect of the invention, the method is used to gain access to packet data transmission channels in a cellular radio CDMA system. The packets may thus be access request messages (ARMs). The packets may also be data packets.

In a further aspect of the invention, there is provided a method of transmitting ARMs to gain access to a packet data telecommunications channel, comprising the steps of:

- transmitting ARMs from multiple terminals as overlapping packets, where each identical packet contains several repetitions of an identical spreading sequence for each terminal; the ARMs corresponding to different terminals being arranged into frames;
- allocating a respective mini-slot in each frame to a particular terminal as an initial synchronization and identification reference for an ARM transmitted from the particular terminal; each ARM being longer than its associated mini-slot, but the ARM beginning inside the mini-slot; and
- at each terminal, beginning to transmit data from the terminal after a base station allocates to it a packet data transmission channel upon successful receipt of an ARM.

Each mini-slot should be sufficiently long to avoid a collision between ARMs sent from different terminals.

In a further aspect of the invention, the data packet, or ARM, is transmitted within a cell over a radio channel, the channel has a cell-size dependent propagation delay and a maximum excess delay, and each mini-slot has a length at least equal to the maximum excess delay plus twice the maximum expected propagation delay plus guard time.

The mini-slot may be allocated to a terminal upon registration of the terminal in a telecommunications system.

These and other aspects of the invention, including apparatus for implementing the invention, are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present.

In the mini-slotted SDTX-MAC scheme, a unique structure is provided for the time frame in which the data is transmitted. In a preferred implementation, data is sent in frames, and each frame is divided into slots. The frames are of equal length to each other, and likewise the slots are of equal length to each other. Each time slot with length $T_{LP}$ is further divided into short minislots, each of which is dedicated to one of the mobile terminals. The length of the minislot is denoted by $T_m$ in FIG. 4. The total number of the minislots within one slot is limited primarily by the spread spectrum system's processing gain $P_G$, and can normally reach at least 0.2 $P_G$. If the time $T_m$ is long enough to separate the received signals by at least the maximum excess delay plus twice the maximum expected propagation delay plus some guard time, collision is avoided. $T_m$ is much smaller than $T_{LP}$. Assume the number of minislots in one slot is N, the length of the packet is $T_p$, and all packets are equal in length. Then:

$$T_{LP}=(N-1)T_m+T_p+T_G$$

where $T_G$ is the slot guard time.

Note that $T_p+T_G$ is the slot length of a conventional TDMA (without partitioning into minislots), and $T_m$ is much smaller than $T_p$. Thus, the slot in the proposed scheme is only moderately longer than the conventional TDMA slot, but the scheme's throughput is greatly increased to around 0.2 $P_G$. Also, that the advantage of having only one spreading code for all packet data users is preserved. The slot length of the M-SDTX-MAC may be up to twice the original length in the conventional TDMA for the extreme case of maximum slot utilization (when resulting increased multiuser interference can be tolerated by the system), but the throughput is greatly increased As in [24], all users are still assigned the same PN code, and the synchronization mechanism will not need to be changed. Since the slotted timing structure is transmitted to the users upon registration, the acquisition of synchronism before each packet transmission is relatively simple, because the PN sequence timing uncertainty is caused only by the propagation delay ambiguity due to the user's movement during the off period. Hence, rapid acquisition algorithms may be employed.

Figure 1:
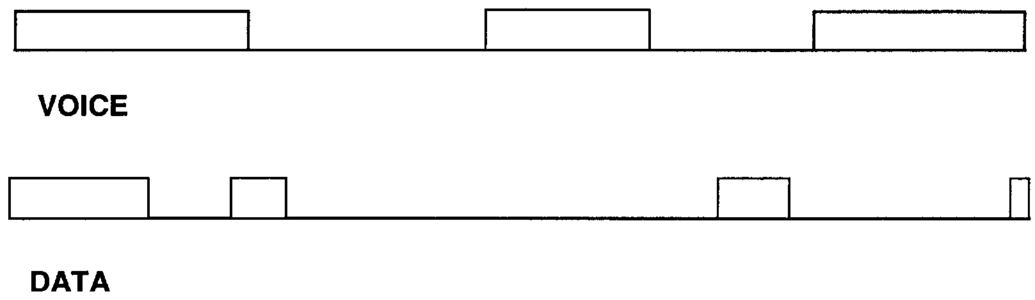
FIG. 1 is a schematic showing traffic characteristics of voice and data.
Figure 2:
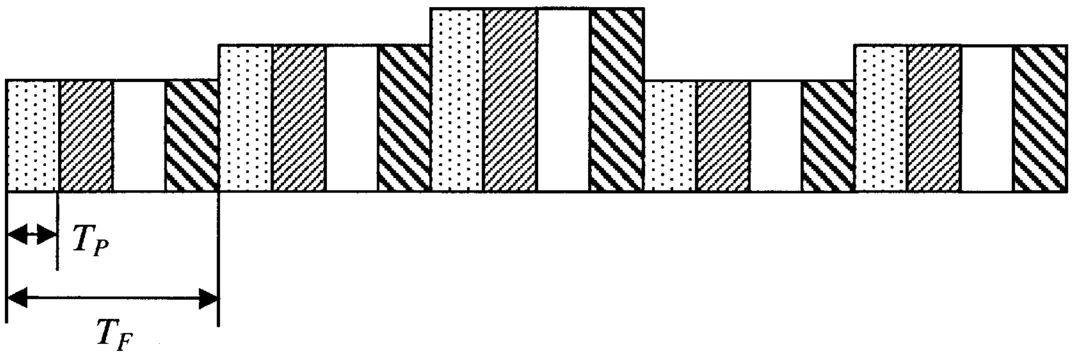
FIG. 2 is a graph showing structure and parameters of the prior art SDTX-MAC protocol.
Figure 3:
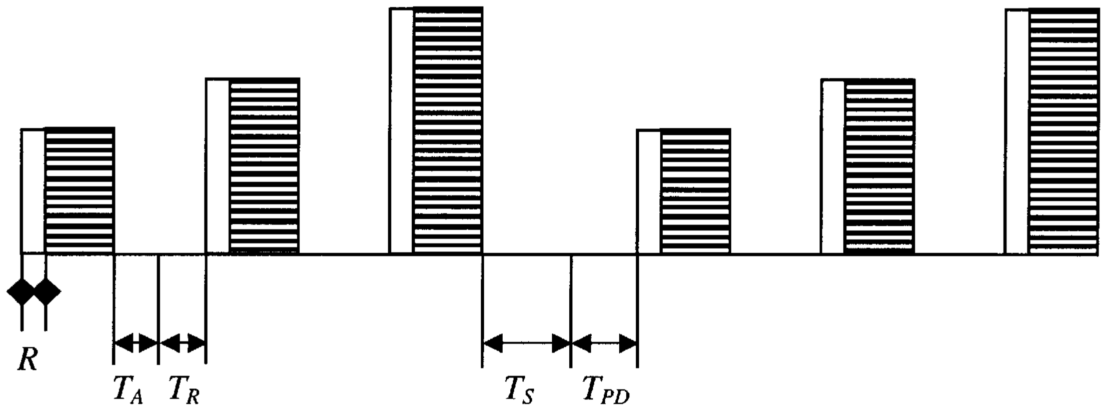
FIG. 3 is a graph showing structure and parameters of the prior art ADTX-MAC protocol.
Figure 4:
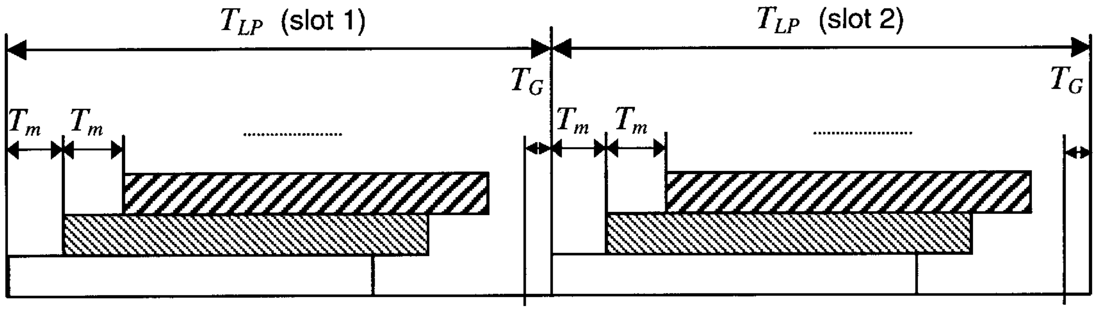
FIG. 4 is a graph showing structure and parameters of the M-SDTX-MAC protocol.

Although the system may be used for transmission of data packets generally, it has particular utility when the packets are ARMs. As shown in FIG. 4, ARMs are transmitted from multiple terminals as overlapping packets. Each identical packet contains several repetitions of an identical code spreading sequence for each terminal. The ARMs corresponding to different terminals are arranged into frames in conventional manner. A respective mini-slot in each frame is allocated to a particular terminal as an initial synchronization and identification reference for an ARM transmitted from the particular terminal. The method only works if all users in the system have a common time reference, such as is conventionally provided in CDMA cellular systems by satellite time information, and it is assumed that such a time reference is present in the system. Each ARM is longer than its associated mini-slot, but the ARM begins inside the mini-slot. At each terminal, data is transmitted from the terminal after a base station allocates to it a packet data transmission channel upon successful receipt of an ARM. The length of the data packet or ARM is determined by the requirements of the spreading code acquisition circuit Short packets may be transmitted on an access channel that does not require closed loop power control. Longer, or more fret packets are preferred for transmission on a dedicated data channel on which closed loop power control is established. The ARM only needs to contain several repetitions of an identical spreading sequence, but may carry redundant information, at the expense of reducing bandwidth efficiency.

Although the system has been described with frames, slots and mini-slots, big slots (of length $T_{LP}$) are not required in the scheme. All that is needed are the mini-slots and the frame. Positions of the mini-slots inside the frame must be known, because user identification is based on the position. The name mini-slots, rather than slots, is continued to be used because they are much shorter than ARMs or short packets. It is desirable to keep Tm as short as possible, because for a given number of users (the maximum of which is determined by the system's interference-limited capacity) the length of the frame is directly proportional to Tm, and a longer frame causes longer delay introduced by the scheme. The minimum value of Tm is equal to: the maximum excess delay of the radio channel+twice the maximum expected propagation delay in the cellular system+some small guard time (smaller than either of the first two terms). The possible range of Tm is from the minimum up to but not including the full length of the packet. The preferred value of Tm is the minimum, in order to maximize system capacity.

The guard time is used to account for implementation imperfections, for example synchronization imperfections, thus to guarantee avoidance of collisions. A value smaller than the maximum excess delay of the radio channel will be sufficient for the guard time.

The M-SDTX-MAC system may be used in the system described in [24], and may be used as the MAC protocol in other systems. For example, one new GSM data service [25], called general packet radio service (GPRS) requests each mobile terminal to contend the physical GPRS packet data channel by using a MAC protocol, which is slotted-ALOHA with reservation. If the offered traffic is very high, slotted-ALOHA's performance is not satisfactory. The present scheme is better than the conventional slotted-ALOHA.

Structure of Access Request Messages

In the SDTX scheme the ARM contains a number of repetitions of a short PN spreading code. The ARM in the M-SDTX-MAC scheme is exactly the same as that of the SDTX scheme. In the ADTX-MAC scheme an ARM contains a synchronizing preamble which is exactly the same as the ARM in the SDTX-MAC, and an appendix for identification. The ID appendix contains sixteen 64-ary Walsh symbols and each Walsh symbol is further spread by a factor of 4. Each Walsh symbol in the appendix contains six codeword elements. A shortened binary (96, 33) BCH code is used to encode the appendix. The code is shortened from the binary primitive (127, 64) BCH code with $d_{min}$ equal to at least 21 [8]. Since a shortened cyclic code has error detection and correction capability at least as good as that of the original code, the (96, 33) BCH code can detect all error patterns containing up to 20 errors, and it uses the same encoder and decoder as the original (127, 64) BCH code.

Synchronizer Circuits

The process of synchronizing the received PN signals is carried out in two steps. The first step is the determination of the initial code phase; this is called code acquisition. The purpose of the code acquisition is to align the two PN signals within a small (typically less than ½ of a PN chip) relative timing offset. The second step is to achieve fine code synchronization after initial acquisition, which is called code tracking. Only code acquisition is discussed here.

Figure 5:
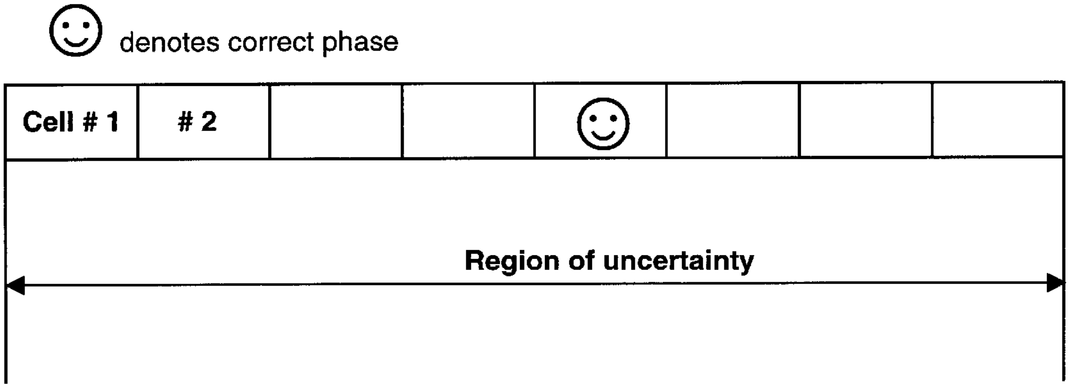
FIG. 5 is a graph showing time or phase uncertainty region.

The most commonly used PN sequence acquisition technique is the so-called serial-search technique, in which the synchronization system evaluates the time cells of FIG. 5 one after another (serially) until the correct cell is found. For example, as shown in FIG. 5, if the system first evaluates cell #1, it will fail since the correct cell is #5; the serial-search system will keep trying cell #2, then #3, and finally hit the correct cell #5.

Figure 6:
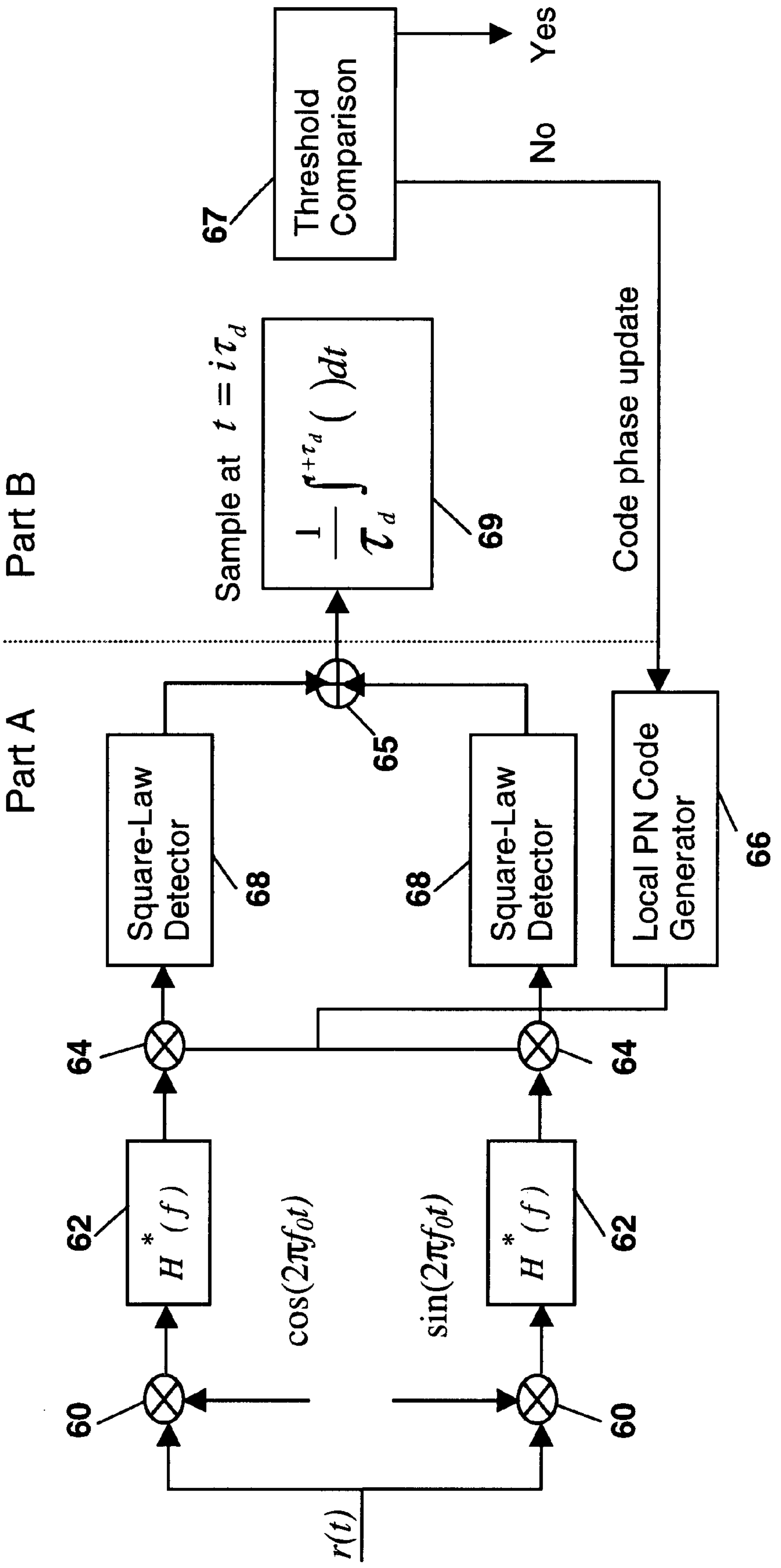
FIG. 6 is a block diagram of a single dwell time PN acquisition system for use in an implementation of the invention.

Since the initial code phase is commonly determined before any carrier phase elimination or tracking is attempted, a noncoherent detector must be used in the acquisition system. That is, the synchronizer may be comprised of a bandpass filter centered at the carrier frequency, followed by a square-law detector, an integrate-and-dump circuit, and a threshold device [9], [10]. Depending on whether the detector's decision is made on the basis of a single fixed time observation of the received signal or many such observations, commonly used serial search techniques can be further divided into single dwell and multiple dwell types [11]–[16]. A simple block diagram of the single dwell acquisition system is illustrated in FIG. 6, where r(t) is the received signal, $f_0$ is the carrier frequency, H*(f) is the transfer function of a filter 62 matched to the PN chip waveform, and $\tau_d$ is the fixed integration time or dwell time.

The acquisition procedure for the single dwell scheme in FIG. 6 can be briefly described as follows: the received signal is first downconverted to in-phase and quadrature components at down-converter 60, then passed through the chip waveform matched filter 62, and actively correlated in correlator 64 with the local replica of the PN code generated by generator 66. The output is then square-law envelope detected in envelope detector 68 summed at summer 65, and integrated over a fixed dwell duration, $\tau_d$, in an integrate-and-dump circuit 69, and then compared to a preset threshold in comparator 67. If the output is larger than the threshold, a "hit" or correct cell is declared found, and if not, the local PN code generator 66 will shift its code phase (go to another cell), and the search will continue until the correct cell is found.

Figure 7:
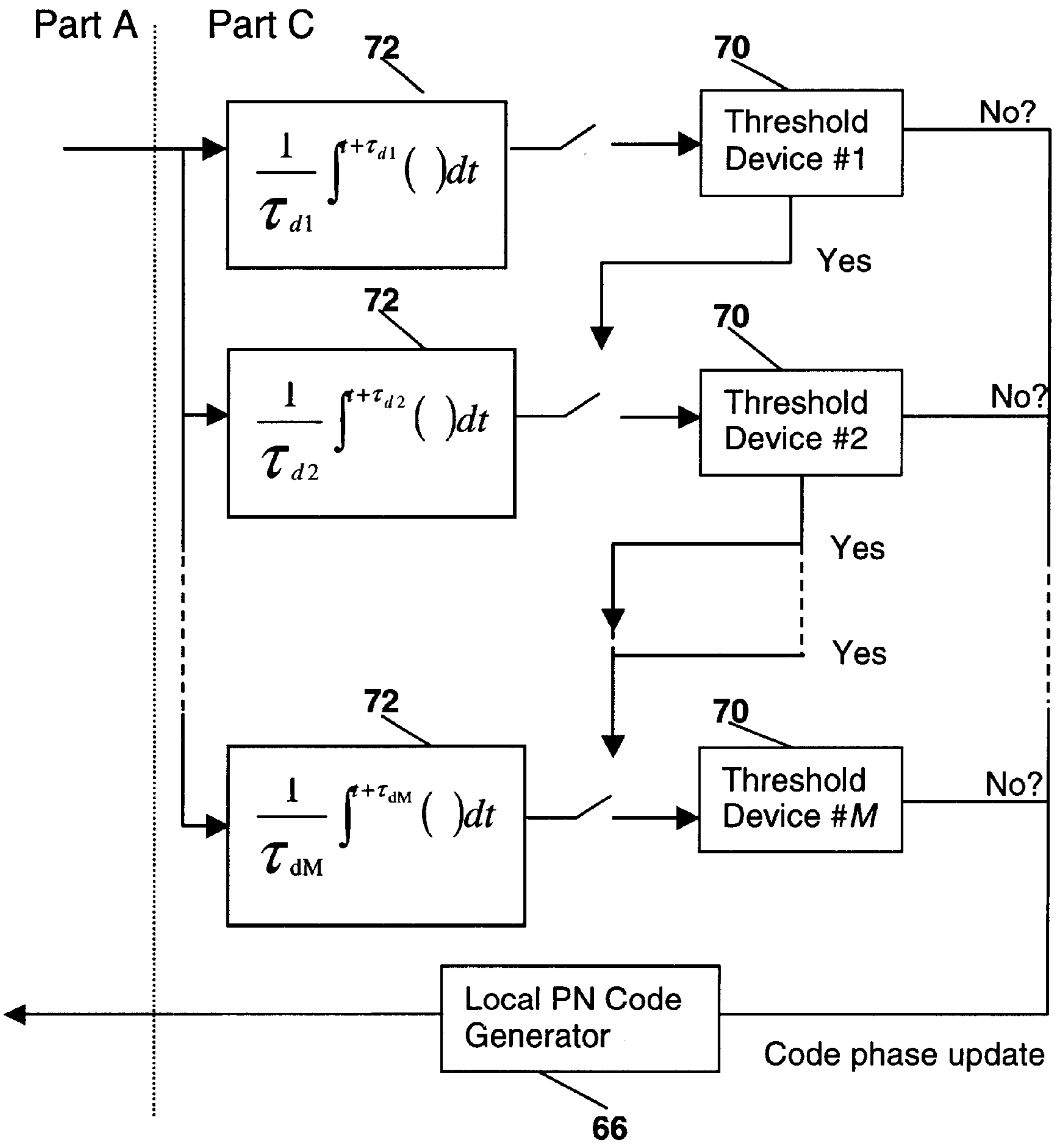
FIG. 7 is a block diagram of a multiple dwell time PN acquisition system.

In a multiple dwell serial search code acquisition system, the examination interval consists of a series of fixed short dwell periods (each longer than its predecessor) with a decision being made after each. This technique is illustrated in FIG. 7. The part A in this figure is exactly the same as FIG. 6.

In FIG. 7, the multiple dwell periods are ordered such that:

$$\tau_{d1} \leq \tau_{d2} \leq \ldots \leq \tau_{dM} \qquad (2.1)$$

The principle of operation for the front end of the system ("part A" in the Figure) is the same as that in FIG. 6. Differently from the single dwell search scheme, a multiple dwell search scheme makes a decision by examining all M threshold devices 70 in FIG. 7. Specifically, a multiple dwell search is carried out according to the following algorithm:

1. The output from the front end is integrated for $\tau_{d1}$ at integrator 72. At the end of the integration, if the result is larger than the threshold, a "hit" is declared and a second integration begins. If a second "hit" is declared, then the third integration begins. Finally, if all of the M threshold devices 70 indicate the correct cell is hit, the decision is made and the search will stop.
2. If any one threshold device 70 shows no threshold crossing, a "miss" is declared, and local code generator 66 will shift its code phase, upon which the next cell is examined. In other words, as soon as one device 70 indicates the codes are misaligned, the remaining devices 70 will stop making decisions.

In all of the code acquisition schemes discussed above, the received signals were correlated with a locally generated replica of the spreading waveform to determine whether the local phase was correct. The duration of this correlation ($\tau_d$ in FIG. 6) may be anywhere from 10 to several thousand times of the chip duration [15]. Denote $\tau_d = KT_c$, where $T_c$ is the duration of a spreading chip. Since the local PN code reference phase can be updated only at $\tau_d$ intervals, the search rate is [9]:

$$R = 1/\tau_d = 1/KT_c. \qquad (2.2)$$

Figure 8:
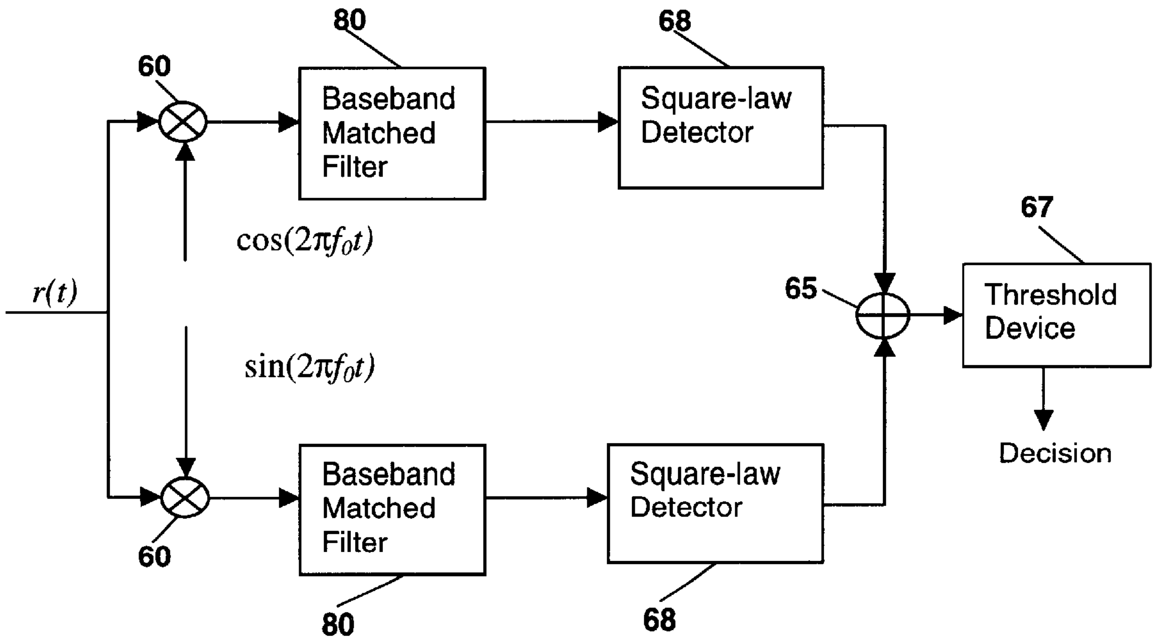
FIG. 8 is a block diagram showing a matched filter acquisition synchronizer.

The search rate can be significantly increased if the time to evaluate each phase cell is reduced. A matched filter 80 can be used to replace the correlation-and-integration operation as shown in FIG. 8, [15], where a baseband filter 80 is matched to a segment of the PN spreading waveform. Conceptually, the filter 80 matched to a segment of the PN spreading waveform can be realized as a cascade of a filter matched to the chip waveform followed by a digital filter matched to the spreading PN code. Suppose now that s(t) corresponds to an N-chip segment of the PN waveform. If N is the period of the PN code, then a fill period PN code correlation is used; otherwise, a partial PN code correlation is utilized. s(t) is given by:

$$s(t)=\sum_{i=1}^{N}a_i h(t-iT_c) \tag{2.3}$$

where $\{a_i\}=\{a_1, a_2, \ldots, a_N\}$ is a PN spreading code vector, $a_i \epsilon \{-1,1\}$, and h(t) is the basic chip waveform which in the simplest case is given by:

$$h(t)=\begin{cases}\dfrac{1}{\sqrt{T_c}} & 0\le t\le T_c\\ 0; & \text{otherwise}\end{cases} \tag{2.4}$$

Figure 9:
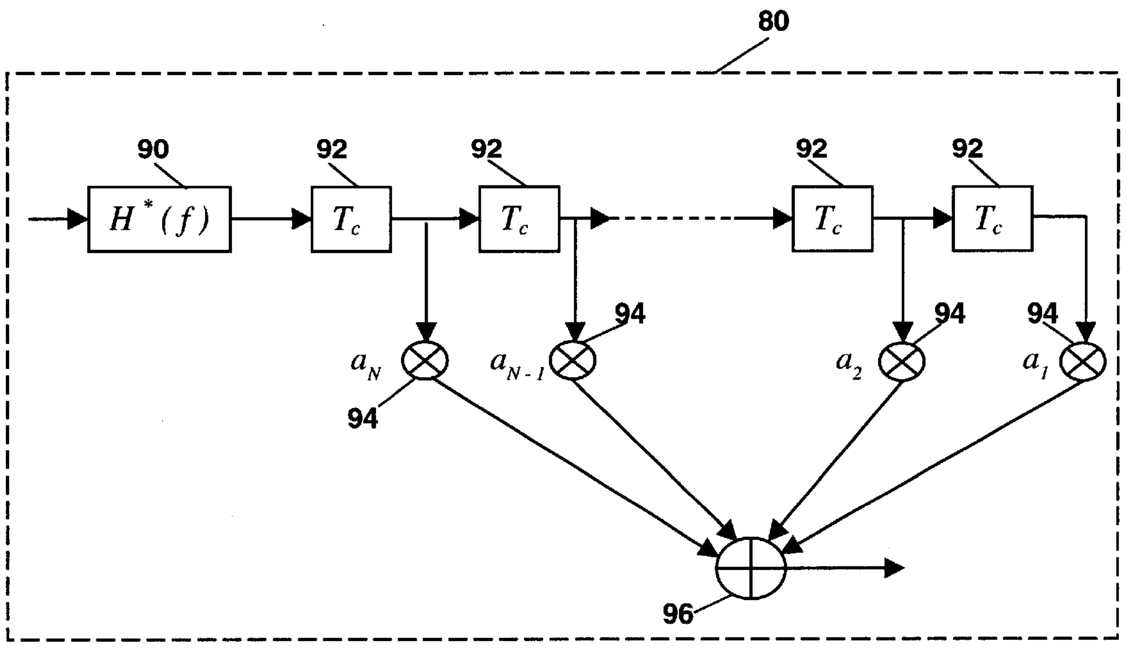
FIG. 9 is a block diagram showing a discrete-time implementation of a filter matched to an N-chip spreading waveform.
Figure 10:
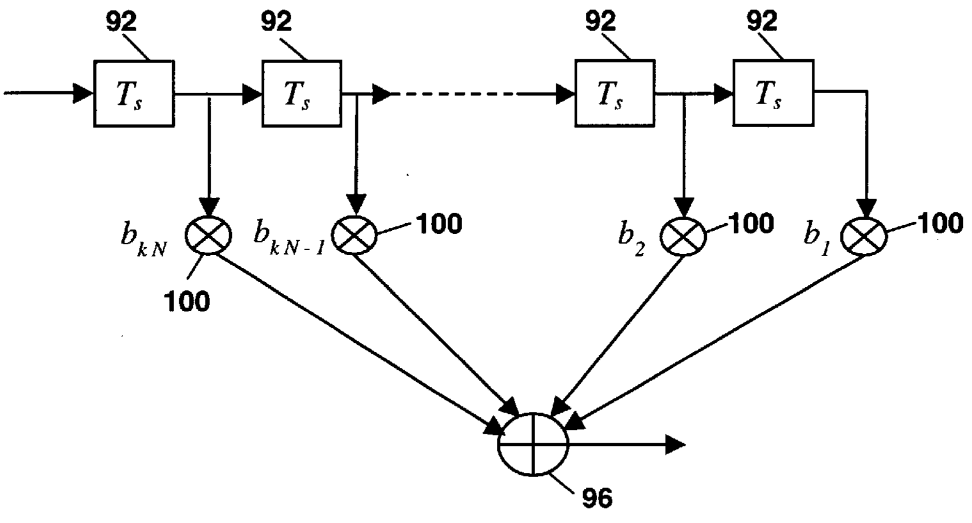
FIG. 10 is a block diagram showing an oversampled discrete-time matched filter.

Equation (2.3) can also be written as:

$$s(t)=h(t)*\sum_{i=1}^{N}a_i\delta[t-(i-1)T_c] \tag{2.5}$$

where * denotes the convolution operation, and δ(t) is the Dirac delta function. The Fourier transform of s(t) is:

$$S(f)=H(f)\sum_{i=1}^{N}a_i e^{-j2\pi f i T_c} \tag{2.6}$$

where $j=\sqrt{-1}$. The transfer function of the filter matched to s(t) is:

$$\begin{aligned} S_M(f) &= S^*(f)e^{-j2\pi f N T_c} \\ &= H^*(f)\sum_{i=1}^{N}a_i e^{j2\pi f(i-1)T_c}e^{-j2\pi f N T_c} \\ &= H^*(f)\sum_{i=1}^{N}a_{N-i+1}e^{-j2\pi f i T_c} \end{aligned} \tag{2.7}$$

where superscript* denotes complex conjugation. Clearly (2.7) can be implemented in the form of a filter 90 matched to a single PN chip waveform followed by a discrete-time filter matched to the PN code, formed of time delays 92, multipliers 94, and summer 96, which is illustrated in FIG. 9. The time delayed input is multiplied by the values of the code vector in the multipliers 94, and the output from the multipliers summed in summer 96. The sampling period $T_s$ in the discrete-time implementation may be shorter than the chip interval: $T_s=T_c/k$, where k=1,2, . . . The discrete-time matched filter in FIG. 9 then takes a form depicted in FIG. 10, with multipliers 100, where $b_l$ is the l-th sub-chip polarity related to $a_i$ in FIG. 9 by:

$$b_{(i-1)k+l}=a_i, \text{ for } l=1,2,\ldots,k; i=1,2,\ldots N$$

The code phase in FIG. 8 is tested after each interval $T_s$. In other words, the received signal is advanced by only a 1/k fraction of a chip for each correlation test to determine if the received code phase is correct; this new signal is combined with the prior kN−1 received signal samples stored in the shift register. Thus, the search rate for this acquisition method is clearly [9]:

$$R=1/T_s=k/T_c \tag{2.8}$$

As may be seen from a comparison of (2.8) with (2.2), the acquisition technique using a matched filter is a factor of $(k/T_c)/(1/KT_c)=kK$ faster than that of the serial search technique. This reduction in search time has been achieved by freezing the phase of the receiver reference spreading code and waiting for a particular phase of the received waveform to arrive. The penalty paid for the matched filter search technique is that the receiver needs to store, prior received information before testing each new received signal. The serial search scheme may be called a search technique without memory, and the matched filter technique is a search technique with memory.

Due to its short search time, a digital differential matched filter synchronizer for rapid synchronization of packet data transmissions is considered here.

Modified Synchronizer Using Matched Filter Techniques

Figure 11:
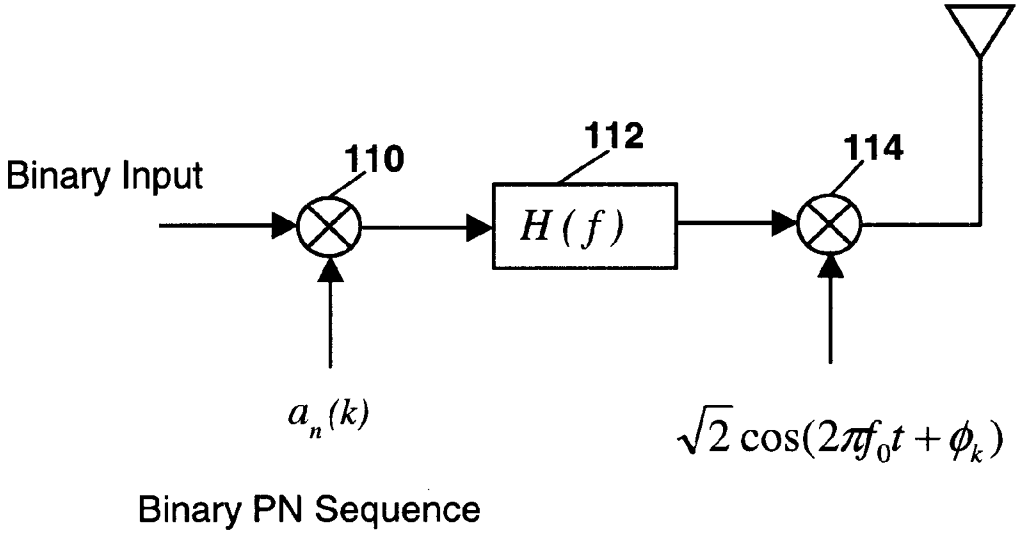
FIG. 11 is a block diagram showing a BPSK direct sequence spread spectrum transmitter.
Figure 12:
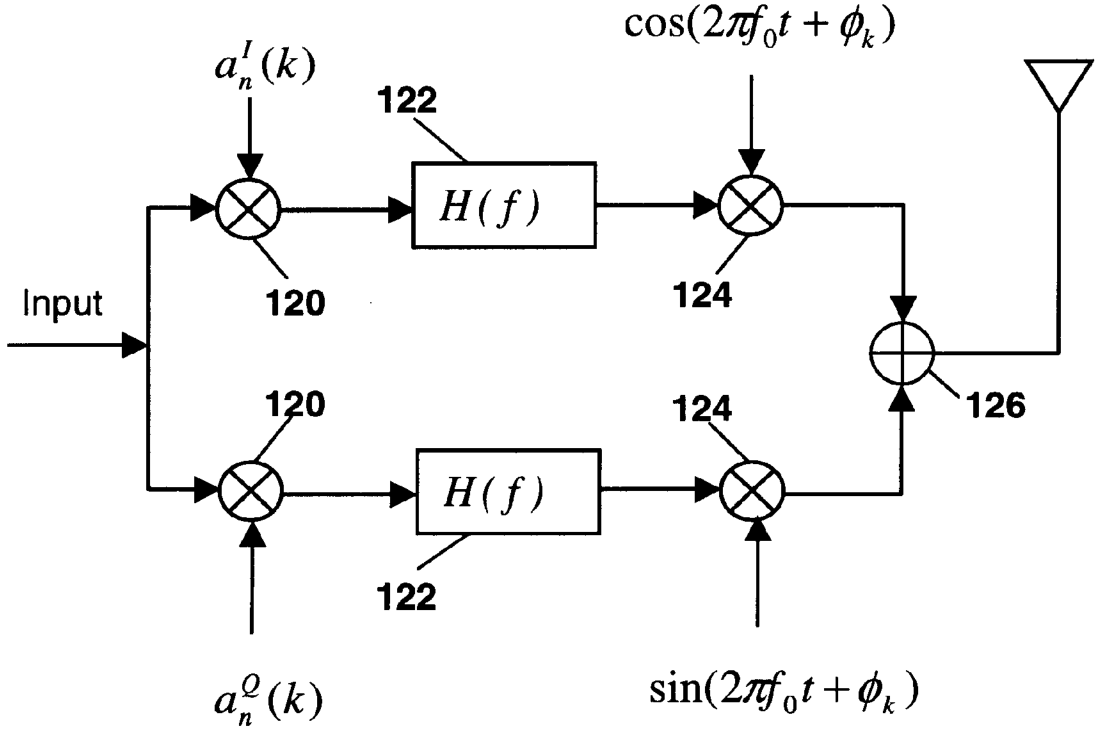
FIG. 12 is a block diagram showing a QPSK direct sequence spread spectrum transmitter.
Figure 13:
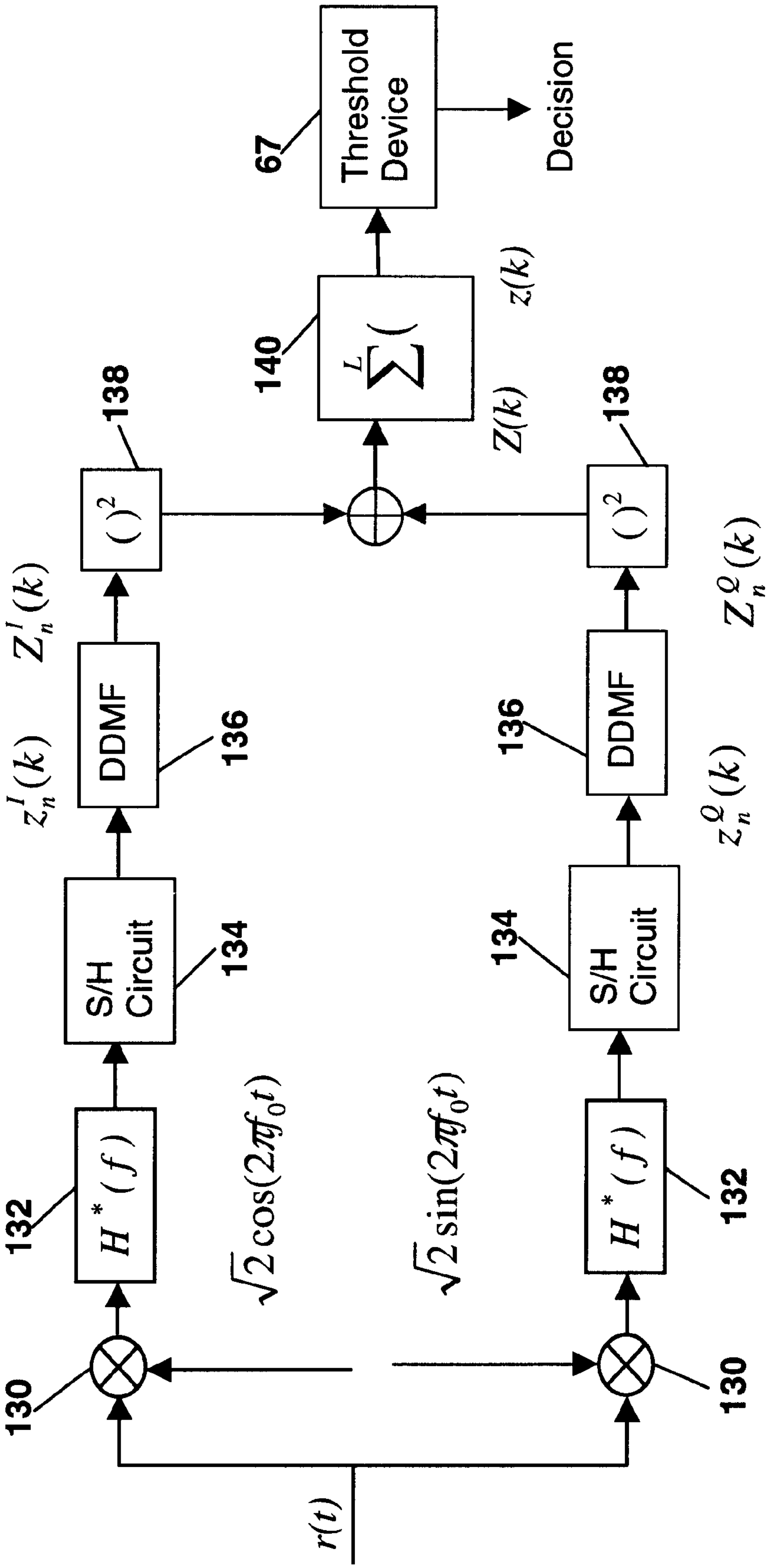
FIG. 13 is a block diagram of a synchronizer for BPSK spreading.
Figure 14:
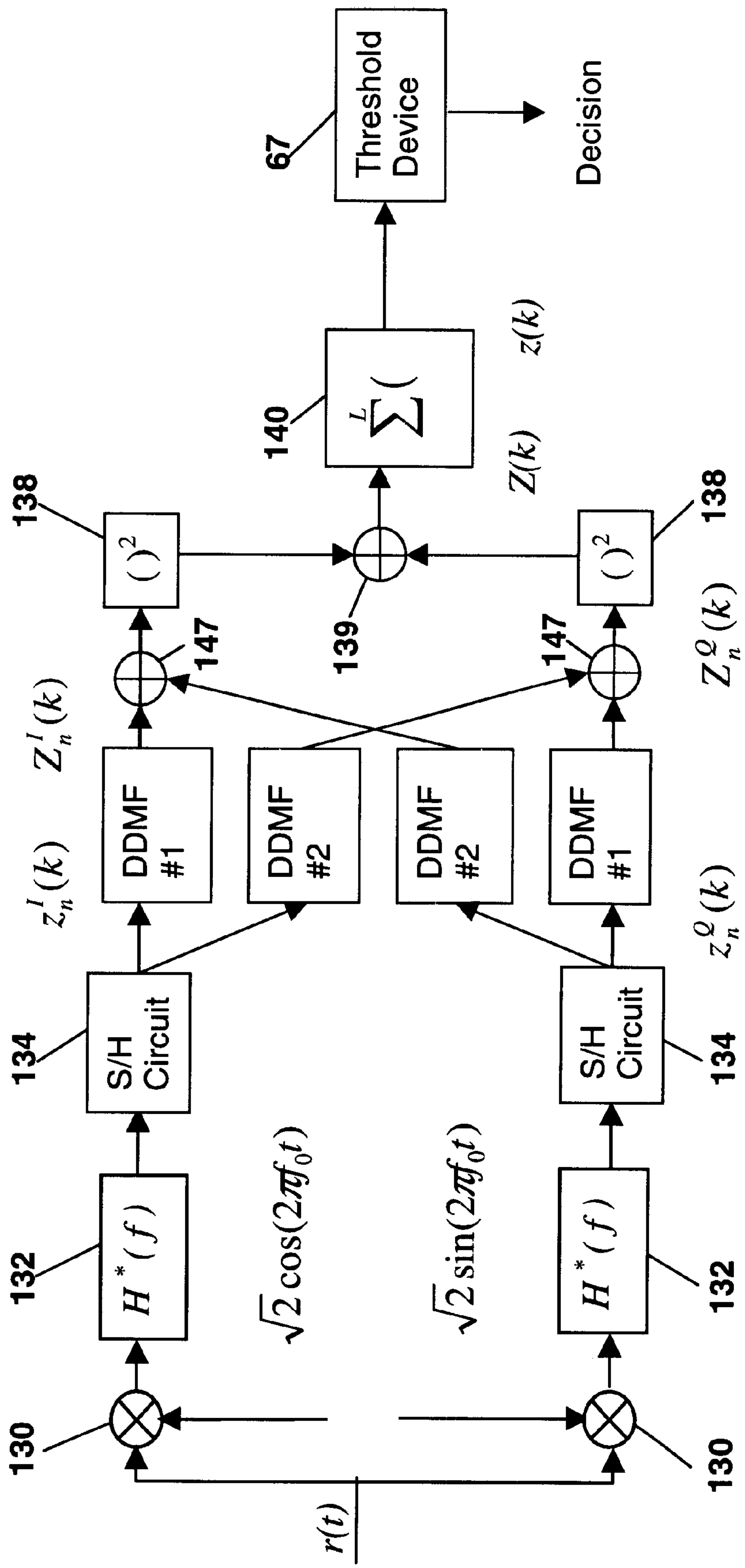
FIG. 14 is a block diagram of a synchronizer for QPSK spreading.

Fundamental digital spread spectrum modulators for both BPSK and QPSK spreading [17] are presented in FIG. 11 and FIG. 12, and the corresponding simplified block diagrams of the synchronizers for both BPSK spreading and QPSK spreading are shown in FIG. 13 and FIG. 14. In FIG. 11, the input data is spread with the PN code in encoder 110, filtered in filter 112 and upconverted for transmission in upconverted 114. In FIG. 12, the input data is divided into inphase and quadrature components, then spread in encoders 120, filtered in filters 122, upconverted in upconverters 124 and added together in summer 126 for transmission.

Figure 15:
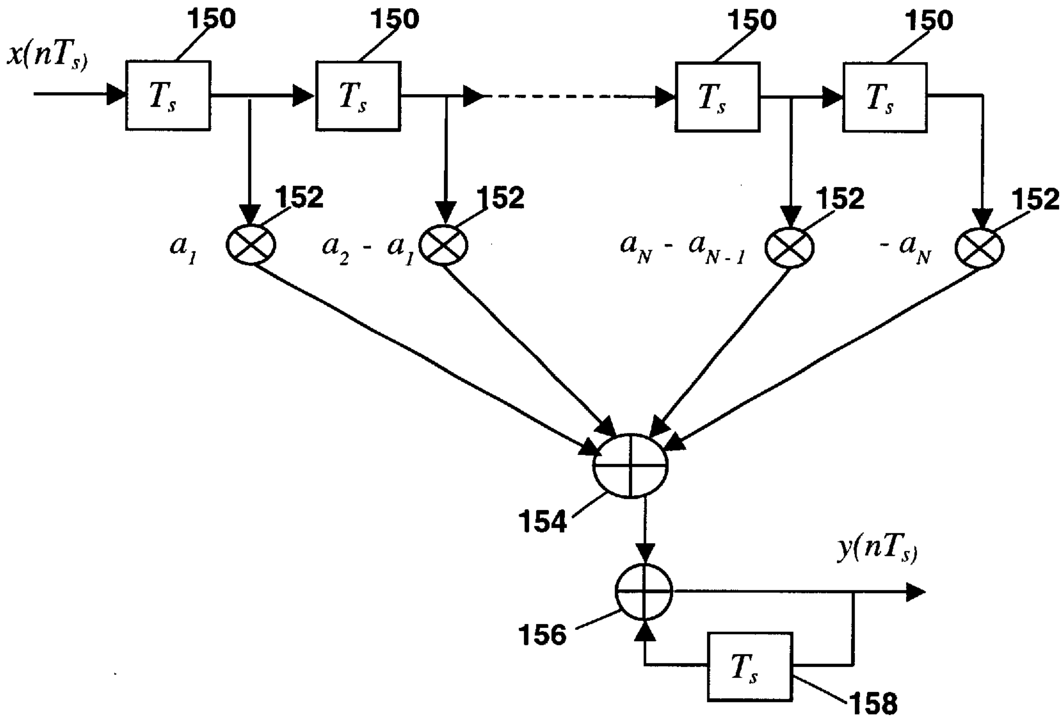
FIG. 15 is a block diagram of a differential discrete-time matched filter.

In FIG. 13 and FIG. 14, the received signal is downconverted in downconverters 130 to form I and Q components, filtered in both I and Q branches by filter 132, and passed to store and hold circuits 134. The sampling period of the sample & hold circuits 134 is $T_s$, and DDMF refers to the differential discrete-time matched filter 136 (see FIG. 15); in FIG. 14, DDMF #1 is matched to the in-phase PN sequences $a_n^I(k)$, and DDMF#2 to the quadrature PN sequences $a_n^Q(k)$. Similar to the operation in FIG. 8, the received signal is first down converted to in-phase and quadrature components, which are then passed through the waveform matched filter, sampled at the rate of $1/T_S$, and fed to the DDMF. The outputs of DDMF #1 and DDMF #2 in both I and Q branches of FIG. 14 are added in combiner 147. The I and Q components are then squared in block 138, and the I and Q branches combined in combiner 139 before being accumulated in accumulator 140. The element 140 for the implementation of the sequential accumulation of outputs (measurements) is added before the threshold test device 67. Synchronism is declared at the sampling point where the accumulated value exceeds the threshold, which is chosen to keep the probability of false acquisition below a certain value. The structure of the DDMF proposed in [18] is shown in FIG. 15, in which an input signal is delayed in delays 150, multiplied by the values of the PN code in multipliers 152, and combined in combiner 154. $x(nT_s)$ is the received digital signal at time $nT_s$, $a_1, a_2, \ldots, a_N$ are the PN sequence chips, and N is the period of the PN sequence. The output is fed back through delay 158 and added to the signal in combiner 156. The DDMF is initially reset to zero. The following relations hold at instants $$nT_s\ (n = 1, 2, \ldots N): \tag{2.9}$$

$$y(T_s) = a_1 x(T_s)$$

$$y(2T_s) = (a_2 - a_1)x(T_s) + a_1 x(2T_s) + y(T_s) = a_2 x(T_s) + a_1 x(2T_s)$$

$$\vdots$$

$$y(NT_s) = a_N x(T_s) + \cdots + a_1 x(NT_s)$$

From equation (2.9), the output of the DDMF 136 is equal to that of the conventional discrete-time matched filter. The difference between a conventional discrete-time matched filter and the DDMF 136 is that the weighting taps of the former are either 1 or −1, and those of the latter are 2,0, or −2 except for a, and $-a_N$. There is no need for multiplication when the taps are zero, so the number of operations is reduced.

Performance Analysis

Probabilities of correct and false acquisitions of the chip synchronizers for both Gaussian and Rayleigh fading channels are derived in this section. The methodology employed here is similar to that used in [17].

When the BPSK spread spectrum modulator is specified as in FIG. 11, the received signal in FIG. 13 can be written as $$r(t)=\sqrt{2E_{c(k)}}\,d_n(k)a_n(k)h(t-nT_s)\cos(2\pi ft+\phi_k)+n(t) \tag{2.10}$$

where the index k indicates kth user, the subscript n refers to the n-th chip, $E_c(k)$ is the chip energy, $d_n(k)$ is the data bit assuming values of +1 or −1, $a_n(k)$ is the binary spreading sequence element assuming values of +1 or −1, $\phi_k$ is a random carrier phase, n(t) is the AWGN with one-sided power spectral density $N_0$ and zero mean, and h(t) is given by (2.4). According to Parseval's theorem:

$$\int_{-\infty}^{\infty} |H(f)|^2 df = \int_0^{T_c} h^2(t)dt = 1 \tag{2.11}$$

Since only synchronizing messages are transmitted during acquisition, the data values are constant ones. When $T_s=T_c$ (see FIG. 13):

$$E[z_n^I(k)] = \sqrt{E_c(k)}\,R(\tau)\cos(\phi_k) \tag{2.12}$$

$$E[z_n^Q(k)] = \sqrt{E_c(k)}\,R(\tau)\sin(\phi_k) \tag{2.13}$$

where r is the timing error, and R(τ) is given by $$R(\tau) = \begin{cases} 1 - \dfrac{|\tau|}{T_c} & |\tau| \le T_c \\ 0 & \text{otherwise} \end{cases} \tag{2.14}$$

$z_n^I(k)$ and $z_n^Q(k)$ also include the components due to background noise, and the other-user interference components. The variance due to the background noise is given by:

$$V_{N_0}=(N_0/2)\int|H(f)|^2df=N_0/2 \tag{2.15}$$

The interference from a user's signal spread by a PN waveform with chip energy $E_c$ and chip duration $T_c$ can be modeled as an equivalent white noise of two-sided density $E_c/T_c$ [17]. In order to calculate the other user interference, from FIG. 11 and FIG. 13 the noise model of the transmitting and receiving process may be simplified as illustrated in FIG. 16.

Figure 16:
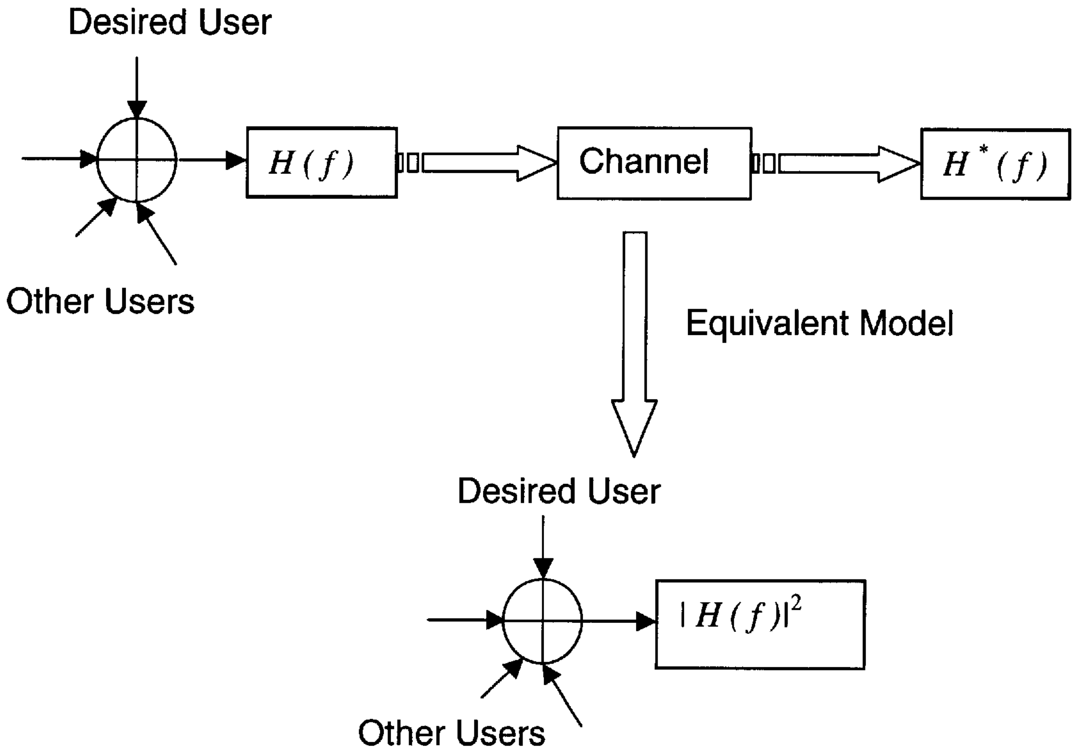
FIG. 16 is a block diagram of a simplified interference model.

From FIG. 16, by assuming undesired users' signals as white noise, the effect of the j-th user's signal on the k-th user (desired one) will be that of white noise with two-sided density $E_c(j)/T_c$ passing through the filter with transfer function $|H(f)|^2$. Taking into account the relative phases of the j-th and k-th users, the variance, denoted by $V_{other}$, due to the j-th user's signal is:

$$V_{other} = \sum_{j\neq k} [E_c(j)/T_c]\cos^2(\phi_j - \phi_k)\int |H(f)|^4 df \tag{2.16}$$

The variances of $z_n^I(k)$ and $z_n^Q(k)$ are thus given by:

$$Var[z_n^I(k)] = Var[z_n^Q(k)]V_{N_0} + V_{Other} \tag{2.17}$$

It is assumed that $z_n^I(k)$ and $z_n^Q(k)$ are Gaussian variables.

It is reasonable to assume that the relative phases of all users are uniformly distributed between 0 and 2π. By averaging (2.16) over all phases, we get:

$$V_{other} = (1/3)\sum_{j\neq k} E_c(j) \tag{2.18}$$

due to:

$$E[\cos^2\phi]=\tfrac{1}{2}$$

$$\frac{1}{T_c}\int_{-\infty}^{\infty}|H(f)|^4 df = \frac{1}{T_c}\int_{-T_c}^{T_c}R^2(\tau)\,d\tau = \frac{2}{T_c}\int_0^{T_c}\left(1-\frac{\tau}{T_c}\right)^2 = 2/3$$

R(τ)(see 2.14) and $|H(f)|^2$ are the Fourier transform pair.

$$\text{Denoting } V_{N_0} + V_{other} = \frac{V_0}{2} : V_o = N_0 + (2/3)\sum_{j\neq k} E_c(j) \tag{2.19}$$

Since the number of taps in the matched filter is N, which is also the period of the synchronizing PN sequence, the following means and variances of the outputs from the DDMF are obtained (for simplification, the index n has been dropped in the following analysis):

$$E[Z^I(k)]=N\sqrt{E_c(k)}R(\tau)\cos(\phi_k) \tag{2.20}$$

$$E[Z^Q(k)]=N\sqrt{E_c(k)}R(\tau)\sin(\phi_k) \tag{2.21}$$

$$Var[Z^I(k)]=Var[Z^Q(k)]=NV_0/2 \tag{2.22}$$

In case that the desired signal is absent, the mean values of both $Z^I$ (k) and $Z^Q$ (k) should be zero, but the variances should be the same as in (2.22). Since $Z(k)=[Z^I(k)]^2+[Z^Q(k)]^2$, Z is a central chi-square random variable with two degrees of freedom when the signal is absent Hence the probability density function (pdf) and the characteristic function of Z are [19]:

$$p_0(Z) = \frac{1}{NV_0}e^{-Z/NV_o} \tag{2.23a}$$

$$\psi_Z^0(jv) = \frac{1}{1 - jvNV_o} \tag{2.23b}$$

When signal is present, Z is a noncentral chi-square variable with noncentrality parameter $N^2E_cR^2(\tau)$. The index k is dropped assuming that the chip energy for all users is $E_c$. The pdf and the characteristic function of Z are also given by [19]:

$$p_1(Z) = \frac{1}{NV_0} e^{-(Z+N^2E_cR^2(r))/NV_o} I_0\left(\frac{2R(\tau)\sqrt{ZE_c}}{V_o}\right) \quad (2.24a)$$

$$\psi_Z^1(jv) = \frac{1}{1-jvNV_o} \exp\left(\frac{jvN^2E_cR^2(\tau)}{1-jvNV_o}\right) \quad (2.24b)$$

where $I_0(x)$ is the zero order modified Bessel function of the first kind.

As seen in FIG. 13, the final decision is based on the comparison between the sum of the L observations and a threshold. Defining the variable z as the sum, and assuming that the L measurements are independent, the characteristic function of z is the L-th power of the right side of either (2.23b) or (2.24b). The probability density functions of z are obtained by inverting the corresponding Fourier transforms, and they have the following forms [19]:

$$p_0(z) = \frac{z^{L-1}e^{-z/NV_o}}{(L-1)!(NV_o)^L} \quad (2.25)$$

$$p_1(z) = \frac{1}{NV_o}\left(\frac{z}{LN^2E_cR^2(\tau)}\right)^{(L-1)/2} e^{-(z+LN^2E_cR^2(r))/NV_o} I_{L-1}\left(\frac{2R(\tau)\sqrt{LE_cz}}{V_o}\right) \quad (2.26)$$

If the decision threshold in FIG. 13 is θ, the false and correct detection probabilities of the synchronizer for BPSK spreading are as follows [17]:

$$P_F = \int_\theta^\infty p_0(z)\,dz = e^{-\theta/NV_o}\sum_{k=0}^{L-1}\frac{(\theta/NV_o)^k}{k!} \quad (2.27)$$

$$P_D = \int_\theta^\infty p_1(z)\,dz = \int_{\theta/NV_o}^\infty \left(\frac{x}{L\varepsilon}\right)^{(L-1)/2} e^{-(x+L\varepsilon)} I_{L-1}\left(2\sqrt{L\varepsilon x}\right)dx \quad (2.28)$$

where ϵ the signal-to-interference ratio (SIR) defined as:

$$\varepsilon = \frac{NE_cR^2(\tau)}{V_o}.$$

The correct and false detection probabilities in (2.27) and (2.28) are valid for additive white Gaussian noise (AWGN) channels, since the received chip energy $E_C$ is assumed to be constant. In a Rayleigh fading channel, $E_C$ should be multiplied by $\alpha^2$, where α is a Rayleigh-distributed random variable with pdf given by [19]:

$$p(a) = \frac{2a}{\sigma^2} e^{-\frac{a^2}{\sigma^2}} \quad (2.29)$$

where $\sigma^2$ is the second moment of α.

The expression for $P_F$ in the Rayleigh fading channel is the same as (2.27), since Rayleigh fading does not affect the average power of the signal. The correct detection probability is derived as follows. First, $p_1$ (Z) in (2.24a) in the Rayleigh fading channel should be like this:

$$p_1(Z) = \int_0^\infty p_1(Z \mid a)p(a)\,da \quad (2.30)$$

Since:

$$I_0(t) = \frac{1}{2\pi}\int_0^{2\pi} \exp(t\cos\phi)\,d\phi,$$

(2.30) can be written as:

$$p_1(Z) = \int_0^\infty \frac{2a}{\sigma^2} e^{-\frac{a^2}{\sigma^2}} \frac{1}{NV_o} e^{-\frac{Z+a^2N^2E_cR^2(\tau)}{NV_o}} \int_0^{2\pi} \frac{1}{2\pi} e^{\frac{2aR(\tau)\sqrt{ZE_c}\cos\phi}{V_o}}\,d\phi\,da \quad (2.31\text{ a})$$

With the following variable changes:

x=α cos ϕ y=α sin ϕ dxdy=αdαdϕ

(2.31a) takes on the following form:

$$\begin{aligned} p_1(Z) &= \frac{1}{\pi}\int_{-\infty}^\infty\int_{-\infty}^\infty \frac{1}{\sigma^2NV_o} e^{-\frac{x^2+y^2}{\sigma^2}} e^{-\frac{Z+N^2E_cR^2(\tau)(x^2+y^2)}{NV_o}} e^{\frac{2xR(\tau)\sqrt{ZE_c}}{V_o}}\,dx\,dy \\ &= \frac{1}{\pi\sigma^2NV_o} e^{-\frac{Z}{NV_o}} \int_{-\infty}^\infty e^{-\frac{x^2}{\sigma^2}-\frac{NE_cR^2(\tau)x^2}{V_o}+\frac{2xR(\tau)\sqrt{ZE_c}}{V_o}}\,dx \int_{-\infty}^\infty e^{-\frac{y^2}{\sigma^2}} e^{-\frac{NE_cR^2(\tau)y^2}{V_o}}\,dy \\ &= \frac{1}{NV_f} e^{-\frac{Z}{NV_f}} \end{aligned} \quad (2.31b)$$

where $V_f=V_0+N\sigma^2E_cR^2(\tau)=V_0NE[\alpha^2]E_cR^2(\tau)=V_0(1+\bar{\epsilon})$, and $\bar{\epsilon}=E[\alpha^2]\epsilon$;

$$\varepsilon = \frac{NE_cR^2(\tau)}{V_0}.$$

An examination of (2.31b) and (2.23a) reveals that (2.31b) is virtually the same as (2.23a) except for the scaling factor $V_f$. Hence, the probability of correct detection in the Rayleigh fading channel has the same form as the probability of the false detection in AWGN, (2.27), but with $V_0$ replaced by $V_f$.

$$P_D = \int_n^\infty p_1(Z)\,dZ = e^{-\frac{\theta}{NV_f}}\sum_{k=0}^{L-1}\frac{\left(\frac{\theta}{NV_f}\right)^k}{k!} \quad (2.32)$$

Probabilities of both correct and false acquisitions for QPSK spreading are the same as those for BPSK [17].

To evaluate the synchronizer's performance, the following parameter values are assumed.

Chiprate 1.2288 Mcps.

Matched filter lengths 128.

Synchronization message consisting of several repetitions of a 128 chip PN sequence.

Figure 17:
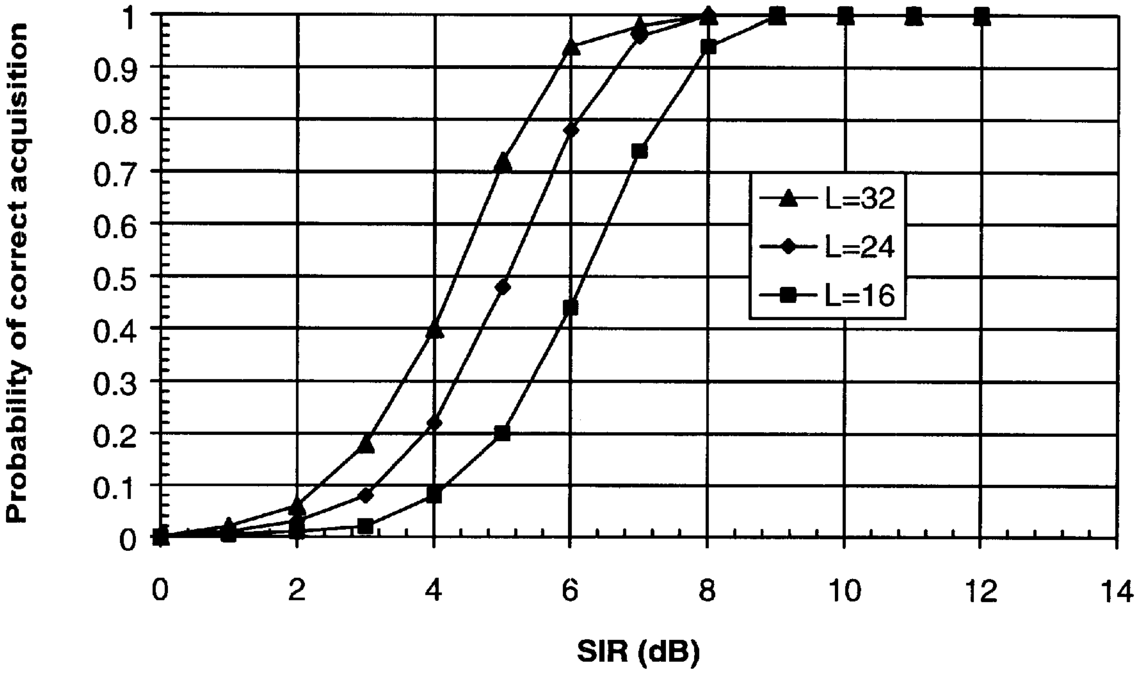
FIG. 17 is a graph showing probability of correct acquisition in the Gaussian channel.
Figure 18:
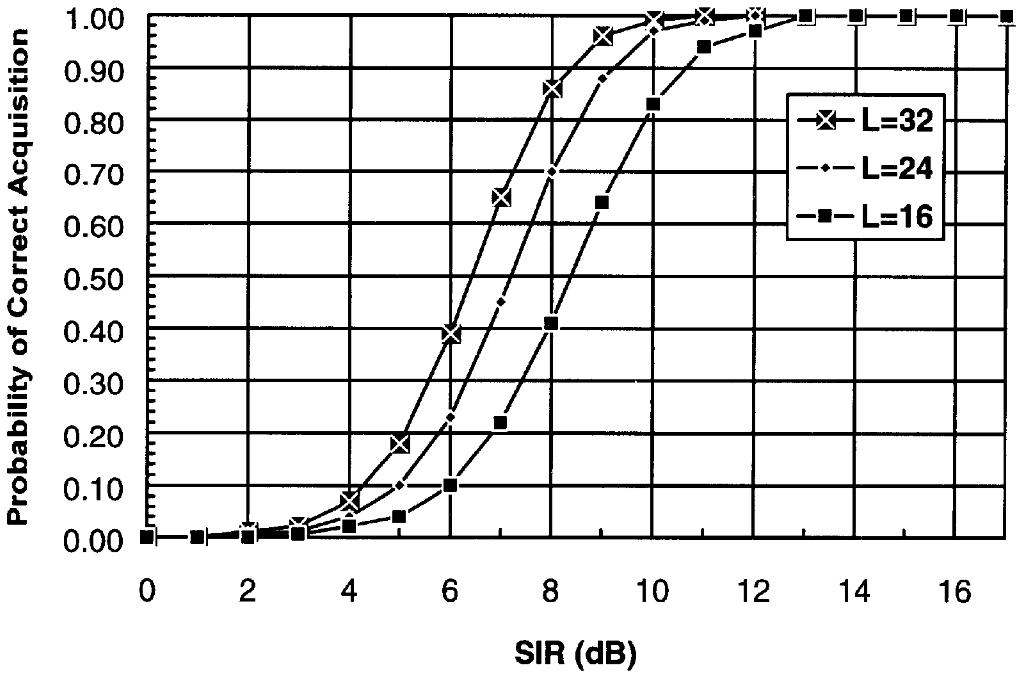
FIG. 18 is a graph showing probability of correct acquisition in the Rayleigh fading channel.

The design objective is to keep the probability of false acquisition below $10^{-6}$. To achieve that, the normalized threshold θ from (2.27) must be found first. The probabilities of correct acquisition from equations (2.28) and (2.32) are computed for the Gaussian and Rayleigh fading channels, respectively. The probability of correct acquisition versus SIR for both the Gaussian and Rayleigh fading channels is plotted in FIG. 17 and FIG. 18 when the probability of false acquisition is specified to be $10^{-6}$. It is seen that, in a Rayleigh fading channel, when the SIR is around 10 dB the synchronizer acquires synchronism over one preamble containing 32 repetitions of 128 chip PN sequence, which is equal to 3.3 ms at the chip rate of 1.2288 Mchips/s.

Delay/throughput Analysis

SDTX-MAC Scheme.

To gain an insight into the influence of false acquisition events on the overall data transmission delay, consider initially a simplified case when all access request messages within a sequence are transmitted at the same power level (which implies that there are no distinguishable ARM sequences). Suppose the synchronization is acquired at the (i+1)-th frame, and there have been k false acquisitions. The random access delay is then:

$$T(i,k)=(i+1)M_F T_P+kT_{fa} \tag{2.33}$$

where $M_F$ is the number of slots in one ARC frame, $T_P$ is the slot length, and $T_{fa}$ is the delay penalty when a false acquisition occurs. The probability of the delay T(i,k) is:

$$P(i,k) = P_D(1-P_D)^i\binom{i}{k}P_F^k(1-P_F)^{i-k} \tag{2.34}$$

where $P_D$ and $P_F$ are the correct and false acquisition probabilities of the synchronizer. Combining equations (2.33) and (2.34), the mean access delay is as follows:

$$\begin{aligned}
E(T) &= \sum_{i=0}^{\infty}\sum_{k=0}^{i} T(i,k)P(i,k) \\
&= \sum_{i=0}^{\infty}\sum_{k=0}^{i} ((i+1)M_F T_p + kT_{fa})P_D(1-P_D)^i\binom{i}{k}P_F^k(1-P_F)^{i-k} \\
&= \sum_{i=0}^{\infty} P_D(1-P_D)^i\left[(i+1)M_F T_p\sum_{k=0}^{i}\binom{i}{k}P_F^k(1-P_F)^{i-k} + T_{fa}\sum_{k=0}^{i}k\binom{i}{k}P_F^k(1-P_F)^{i-k}\right] \\
&= \sum_{i=0}^{\infty} P_D(1-P_D)^i\,[(i+1)M_F T_p + iP_F T_{fa}] \\
&= M_F T_p P_D\left[\sum_{i=0}^{\infty} i(1-P_D)^i + \sum_{i=0}^{\infty}(1-P_D)^i\right] + P_D P_F T_{fa}\sum_{i=0}^{\infty} i(1-P_D)^i \\
&= (M_F T_p + P_F T_{fa})\frac{1-P_D}{P_D} + M_F T_p
\end{aligned} \tag{2.35}$$

where the following identities have been used:

$$\sum_{k=0}^{i}\binom{i}{k}p^k(1-p)^{i-k} = 1;\ p<1$$

$$\sum_{k=0}^{i}k\binom{i}{k}p^k(1-p)^{i-k} = ip$$

$$\sum_{k=0}^{\infty}p^k = \frac{1}{1-p}$$

$$\sum_{k=0}^{\infty}kp^k = \frac{p}{(1-p)^2}$$

From Eqn. (2.35), the effect of false acquisition penalty is negligible when $P_F$ is very small. As explained in [20], the synchronizers are designed to keep the false acquisition probability $P_F$ below $10^{-6}$. Therefore, even if the false acquisition penalty delay $T_{fa}$ is thousand times larger than $T_P$, $P_F T_{fa}$ is still trivial compared with $M_F T_P$. Hence, the effect of false acquisition events is not considered in the following.

Now consider the case when the ARMs within a sequence have increasing power levels, and suppose that synchronism is acquired at the (n−1)-th ARM of the (j+1)-th ARM sequence. The probability of such event is:

$$P(n,j) = \prod_{i=1}^{M_s}(1-P_{Di})^j\prod_{i=0}^{n}(1-P_{Di})P_{D(n+1)};\ P_{D0}=0 \tag{2.36}$$

where $P_{Di}$ is the i-th ARM's detection probability, and $M_s$ is the number of ARMs in one ARM sequence. The random access delay is then:

$$T(n,j)=jM_sT_F+(n+1)T_F;\ T_F=M_F T_P \tag{2.37}$$

Combining (2.36) and (2.37), the mean access delay of the SDTX-MAC scheme is:

$$E(T)=\sum_{j=0}^{\infty}\sum_{n=0}^{M_s-1}T(n,j)P(n,j) \tag{2.38}$$

To compute throughput efficiency, consider how many ARMs need to be transmitted to gain access. That number is given by:

$$N_s=\sum_{j=0}^{\infty}\sum_{k=1}^{M_s}(jM_s+k)\left[\prod_{k=1}^{M_s}(1-P_{Dk})\right]^j\prod_{i=1}^{k-1}(1-P_{Di})P_{Dk} \tag{2.39a}$$

If $P_{D1}=P_{D2}=\ldots=P_{DM_1}=P_D$, (2.39a) can be readily simplified to become:

$$N_s=1/P_D \tag{2.39b}$$

Eqn. (2.39b) is consistent with (2.35) for the case of negligible false acquisition events.

The throughput efficiency, or the ratio of the number of ARMs successfully acquired by the receiver to the number of transmitted ARMs can then be expressed as:

$$n_S=1/N_s \tag{2.40}$$

ADTX-MAC Scheme.

Figure 19:
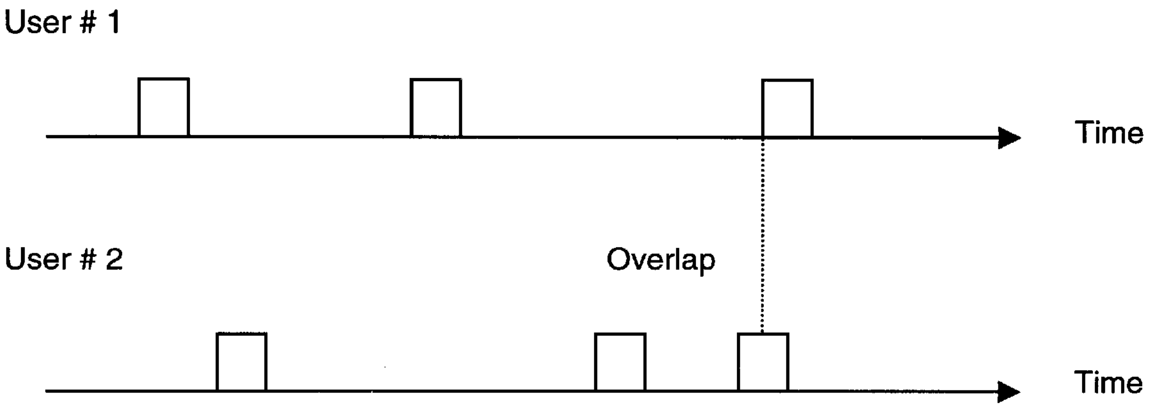
FIG. 19 is a graph showing packets from two users on a pure ALOHA channel.
Figure 20:
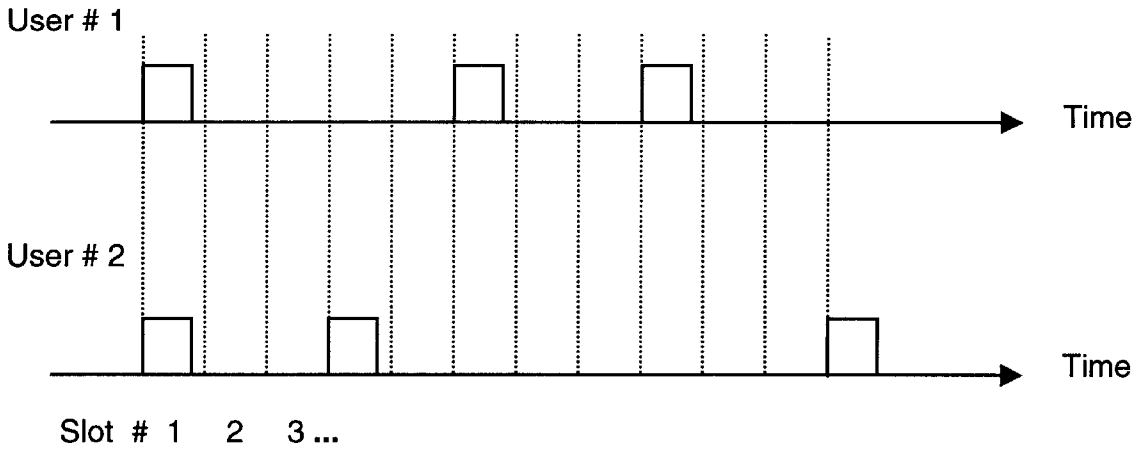
FIG. 20 is a graph showing packets from two users on a slotted ALOHA channel.

The ADTX-MAC scheme is in principle a spread slotted ALOHA. Before embarking on analysis of this scheme, let us first introduce the basics of the original ALOHA systems [4], [21]. There are two versions of conventional ALOHA systems: pure or unsynchronized and slotted or synchronized. In a pure ALOHA system, a user may begin transmitting a packet at any time. In a slotted ALOHA system, a user can transit a packet at the beginning of a time slot only. A simple example (two users only) of the operation of the ALOHA system for both pure and slotted versions is shown in FIGS. 19 and 20. In the conventional ALOHA system (pure or slotted), packets are not spread. Hence, whenever there is a time overlap, a collision occurs, and the packets are destroyed Assuming that start times of transmitted packets form a Poisson point process with the arrival rate λ packets/s, and denote the duration of a packet in seconds as $T_p$, the offered channel traffic G will be $$G=\lambda T_p \tag{2.41}$$

In a pure ALOHA system, collision is avoided if no packets arrive $T_p$ before or $T_p$ after the arrival time of the given packet. Since the start times of all packets are Poisson-distributed, the probability that k packets are generated during a time interval of length t is given by [22]:

$$P(k)=\frac{(\lambda t)^k e^{-\lambda t}}{k!} \tag{2.42}$$

The probability of no collision, which means that zero packets are generated within the time interval of length $2T_p$, is $P(\mathbf{0})=e^{-2\lambda T_p}=e^{-2G}$. Therefore the pure ALOHA channel throughput is:

$$S=Ge^{-2G} \tag{2.43}$$

In a slotted ALOHA system, since a packet can only be transmitted at the beginning of each time slot, the probability of no collision is the probability of an event that no packets are generated during the period $T_p$. The probability of such an event is $e^{-\lambda T_p}$, or $e^{-G}$. The throughput of a slotted ALOHA channel is thus given by:

$$S=Ge^{-G} \tag{2.44}$$

Figure 21:
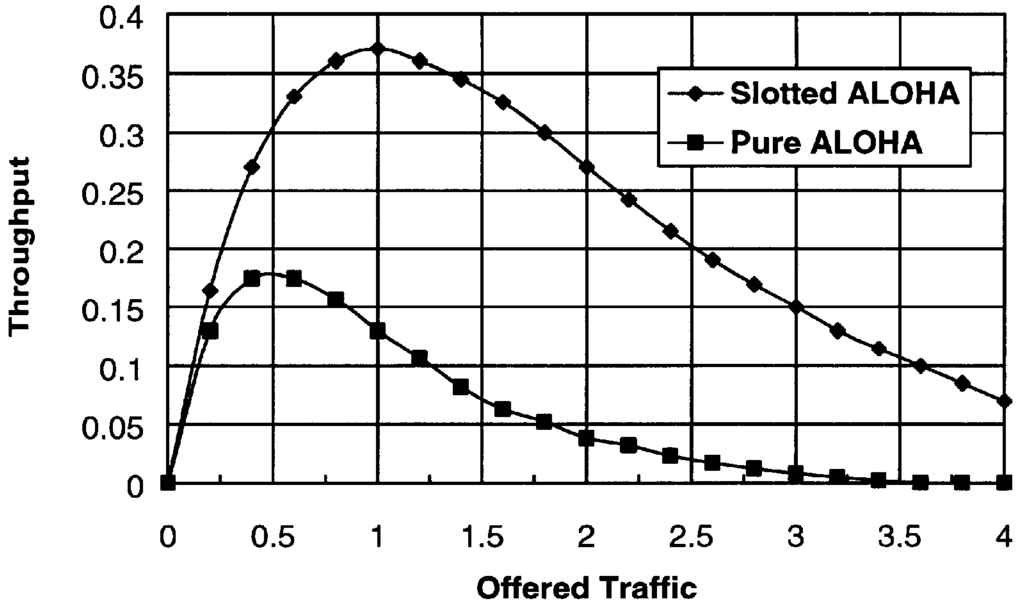
FIG. 21 is a graph showing throughput versus offered traffic for the pure and slotted ALOHA.

FIG. 21 shows the throughput characteristics for pure and slotted ALOHA

The maximum throughput for the pure ALOHA can be found by taking the derivative of (2.43), equating it to zero to obtain the optimal value of G, $$\frac{dS}{dG}=e^{-2G}-2Ge^{-2G}=0\Rightarrow G=\frac{1}{2} \tag{2.45}$$

and substituting this value into (2.43). The maximum throughput is found to be ½e=0.184, which can also be read from FIG. 21. Using the same method, the maximum throughput for the slotted ALOHA is 1/e=0.368 when the offered traffic is 1, twice the capacity of the pure ALOHA channel.

A p-persistent slotted ALOHA is designed to reduce the rate of collisions. In principle it is similar to the p-persistent carrier sense multiple access (CSMA) protocol [7]. The p-persistent slotted ALOHA can be simply described as follows. Before transmitting each packet other than the first packet, the mobile station shall generate a random number in the range <0,1>, and if this number is larger than the probability p, the mobile station shall delay transmission of the packet for a predetermined number of slots.

Figure 22:
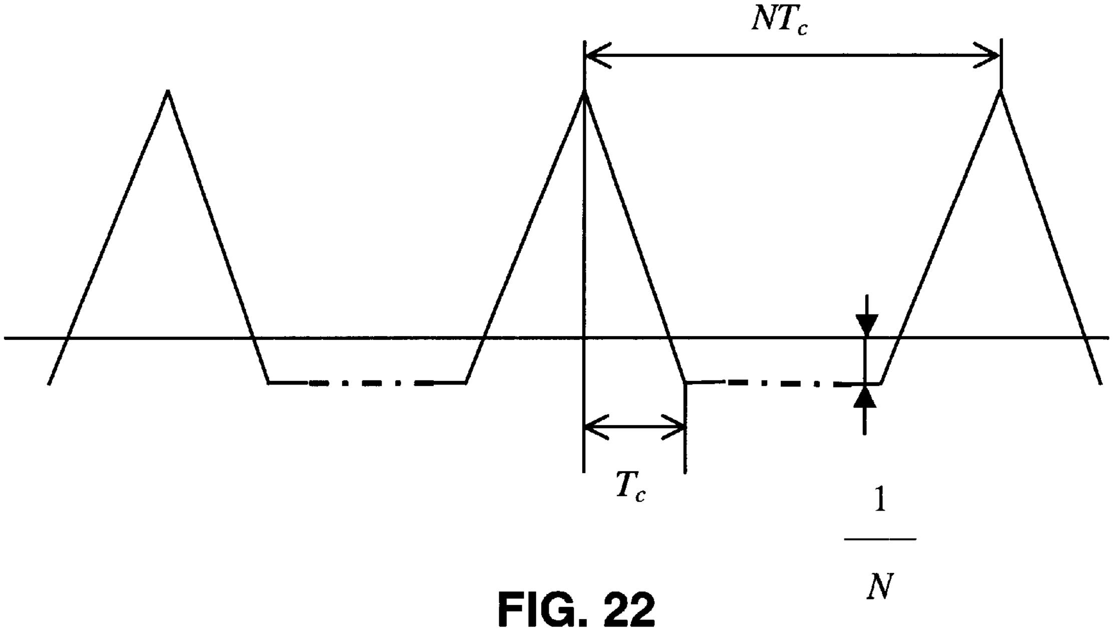
FIG. 22 is a graph showing autocorrelation function for a maximum-length PN sequence.

The ADTX-MAC scheme is a p-persistent spread slotted ALOHA. Due to the slotted ALOHA structure, there is certain probability that one ARM collides with one or more ARMs from other users. However, the collision event in the spread ALOHA is different from that in the conventional ALOHA. In the conventional ALOHA system, any packet overlap implies collision. In the spread ALOHA system, due to the autocorrelation property of PN sequences, time overlap of two packets may not cause collision. The autocorrelation function for a maximum-length PN sequence with chip duration $T_c$ and period $NT_c$[15] is illustrated in FIG. 22. Often, a PN sequence with a very long period is used for spreading. For example in the IS-95 system [3], the length or period of mobile-specific PN sequence is $N=2^{42}-1$, and 1/N is about $2.3\times10^{-13}$. Hence, if the separation time between two mobiles using the same spreading sequence is more than one chip ($T_c$), one appears like noise to the other.

In general, for the ADTX-MAC scheme in flat fading channels the collision occurs only when the relative delay of arriving ARMs is less than one chip time. However, when the transmitted signal propagates through a multipath fading channel, its replicas will arrive at the receiving end at different times spread over the maximum excess delay interval. Denote the maximum excess delay expressed in chip intervals by $\tau_M$. Assume that when the temporal separation of ARMs arriving from different users is larger than ($\tau_M$+1) chip intervals, collisions will not occur. The precise timing of the ARM transmissions in the ADTX-MAC protocol is determined by a procedure called PN randomization. Before transmitting any ARM, the mobile station computes a pseudorandom delay which depends on its electronic serial number (ESN), and delays its transmission by the computed value. Suppose that the maximum PN randomization delay is $R_M$. The probability that a given user's ARM will not collide with other ARMs is the probability that no ARM starts ($\tau_M$+1) chips before or ($\tau_M$+1) chips after the start time of the given ARM. Since each ARM's arrival time is uniformly distributed on (0, $R_M$), the probability of no collision conditioned on the event that k+1 ARMs (one desired and k interfering ARMs) are sent within the interval $(\mathbf{0}, R_M)$ is:

$$P(\text{no\_collision}|\,k) = \begin{cases} 1 & k = 0 \\ (1-2\psi)^k & k \geq 1 \end{cases} \quad (2.46)$$

where $\psi=(\tau_M+1)/R_M$. Let us assume an infinite population model for all bursty data users, with the offered traffic of ARMs of G messages per slot. The probability that there are k ARMs transmitted within one slot is Poisson distributed:

$$P(k) = \frac{G^k e^{-G}}{k!} \quad (2.47)$$

The probability that an ARM will not collide with any other ARM is:

$$P(\text{no\_collision}) = \sum_{k=0}^{\infty} P(\text{no\_collision}|\,k)P(k) = e^{-2G\psi} \quad (2.48)$$

Assuming that the synchronizer is perfect ($P_D=1$, $P_F=0$), the throughput of ADTX-MAC denoted as $S_1$ is then given by:

$$S_1=Ge^{-2G\psi} \quad (2.49)$$

Figure 23:
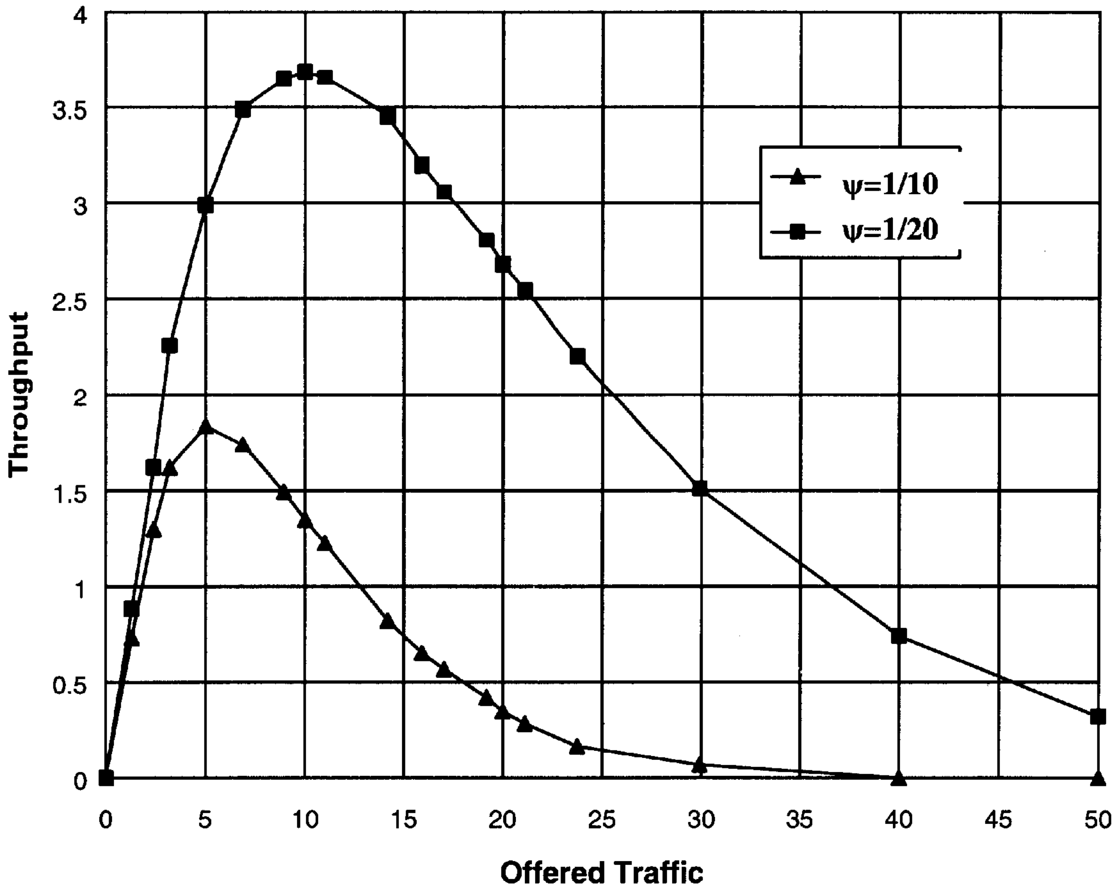
FIG. 23 is a graph showing throughput versus offered traffic for a spread ALOHA channel.

The throughput versus offered traffic is plotted in FIG. 23. As for the pure and slotted ALOHA before, it can be readily shown that the throughput reaches its maximum $S_{1max}=\frac{1}{2}e\psi$ when offered traffic is equal to $\frac{1}{2}\psi$. If the offered traffic is increased above $\frac{1}{2}\psi$, the throughput will decrease. It can also be seen from the figure that the longer the maximum randomization delay, the larger the maximum throughput, but naturally the longer the access delay.

Theoretically, in an interference-limited spread spectrum system, there is a maximum allowed number of users in the channel at the same time. If the simultaneous transmitters exceed that maximum, the system's performance will degrade dramatically. In general, the throughput can be expressed as:

$$S_2 = G\sum_{k=0}^{K} P(\text{no\_collision}|\,k)P(k) \quad (2.50)$$

where K is finite, whereas (2.49) was obtained with no limit on the maximum value. However, to simplify the analysis, (2.49) is used in the remainder of this patent document.

Suppose that the access request is correctly detected at the (n+1)-th ARM of the (j+1)-th ARM sequence. The probability of such an event is:

$$P(n, j) = \left[\prod_{i=1}^{M_s}(1-P_{Di}P_{Ci})\right]^j \prod_{i=0}^{n}(1-P_{Di}P_{Ci})P_{D(n+1)C(n+1)}; \quad (2.51)$$

$$P_{D0} = P_{C0} = 0$$

where $P_{Ci}$ is the probability that no error is detected within the appendix of the i-th ARM, which is the function of the signal to interference ratio (SIR); all other symbols have the same meaning as in (2.36). The probability that no error is detected within the appendix actually consists of $P_{ne}$, the probability that a received message contains no error, plus $P_{ue}$, the probability that the received appendix contains an undetectable error pattern. For a shortened binary (96, 33) BCH code with minimum distance 21, it can be readily shown that $P_{ue}$, is much smaller than $P_{ne}$. Therefore, $P_{Ci}\approx P_{ne}$ can be assumed. The average probability that a received message contains no error is given by:

$$P_{ne}=(1-P_b)^{96} \quad (2.52)$$

where $P_b$ is the average bit error probability of the uncoded link.

The delay corresponding to acquisition in the (n+1)-th ARM of the (j+1)-th ARM sequence is:

$$T(n, j) = (n + jM_s)(T_A + T_R + T_M + \hat{R}_M) + j(T_s + T_{PD}) + T_M + \hat{R}_M \quad (2.55)$$

where $T_A$ is the acknowledgment time-out, $T_R$ is the ARM random back-off delay, $T_M$ is the access request message length, $R_M$ is the randomization delay introduced before any ARM transmission (it depends on the mobile's ESN), $T_s$ is the ARM sequence random back-off delay, and $T_{PD}$ is the p-persistence delay introduced before each new ARM sequence. $T_{PD}$ depends on the parameter p of the p-persistence test, and its average value is calculated as follows:

$$\overline{T}_{PD} = T_M\sum_{i=0}^{\infty} i(1-p)^i p = \frac{1-p}{p}T_M \quad (2.56)$$

Consequently, the mean access delay for the ADTX-MAC scheme can be evaluated as:

$$E(T) = \sum_{j=0}^{\infty}\sum_{n=0}^{M_s-1} P(n, j)T(n, j) \quad (2.57)$$

Just as in the SDTX-MAC scheme, to compute throughput efficiency we first evaluate the number of ARMs that must be transmitted to achieve successful acquisition:

$$N_A = \sum_{j=0}^{\infty}\sum_{k=1}^{M_s}(jM_s+k)\left[\prod_{k=1}^{M_s}(1-P_{Dk}P_{Ck})\right]^j \prod_{i=1}^{k-1}(1-P_{Di}P_{Ci})P_{Dk}P_{Ck} \quad (2.58)$$

Then, the throughput efficiency can be expressed as:

$$\eta_A = \frac{Ge^{-2G\psi}}{N_A} \quad (2.59)$$

M-SDTX-MAC Scheme.

The M-SDTX-MAC protocol's structure and parameters are presented in FIG. 4. As discussed earlier, clearly if $T_m$(the length of the minislot) is larger than the maximum excess delay of the radio channel plus twice the maximum expected propagation delay in the cellular system plus some small guard time, more than one ARM can be transmitted within one regular time slot without collision. Assume the number of minislots in one slot is N (FIG. 4), and all ARMs are equal in length. Then $$T_{LP}=(N-1)T_M+T_P \quad (2.60)$$

Normally, $T_m$ is much smaller than $T_P$, the regular slot duration in the SDTX scheme, and the number of users N is mainly limited by the spread spectrum system's processing gain. N could be around 0.2 $P_G$, where $P_G$ is the spread spectrum system's processing gain. The message length $T_P$ is 4096 chips if the access preamble consists of 32 repetitions of 128 chips. Thus, for typical cell sizes and radio propagation conditions, $T_{LP}$ is only moderately longer than $T_P$ of the SDTX slot.

The mean access delay of the M-SDTX-MAC scheme is still given by (2.38) and (2.37), with $T_P$ replaced by $T_{LP}$, but the correct acquisition probability $P_D$ which is implicitly included in P(n,j), is different from the one for SDTX-MAC due to the multi-user interference in the M-SDTX-MAC scheme. Assuming the signal-to-noise ratio (SNR) in the SDTX-MAC scheme is $\epsilon$, with the same mobile user transmitted power and background noise, the SNR in the M-SDTX-MAC scheme is $$\frac{1}{1/\varepsilon+\alpha},$$

where $N-1=\alpha P_G$. For example, if the SNR in SDTX-MAC is 10 dB, then the SNR in M-SDTX-MAC is about 5.2 dB when $\alpha$=0.2. Hence, the mean access delay of the M-SDTX-MAC is longer than that of the SDTX-MAC scheme. However, the throughput of the M-SDTX-MAC is significantly higher than that of the SDTX-MAC, since in the SDTX-MAC scheme only one user is allowed to transmit his ARM within one time slot, and many users may do that under M-SDTX-MAC.

Performance Evaluation

The delay distributions of the protocols to a large degree depend on $P_{Di}$, the correct detection probability of the access request message. To obtain numerical results illustrating the performance of the three protocols, the following assumptions have been made:

Chip rate is 1.2288 Mchips/s.

A microcell CDMA network is considered with radius 1 km; therefore the maximum round trip delay is approximately 8 chips.

The power increment between ARMs is 2 dB.

ARM in SDTX-MAC contains 32 repetitions of the 128 chip PN sequence.

The maximum number of ARMs within one sequence is $M_S$=16.

The maximum number of ARM sequences in one acquisition attempt is 15.

The Doppler shift is 100 Hz.

There are 25 slots in each access frame on the ARC for SDTX-MAC.

The value of p for the p-persistence test is 0.5.

The maximum randomization delay $R_M$ is 280 chips.

$T_S$, the sequence back-off range is 0~4 slots.

$T_R$, the ARM back-off range is 0~3 slots.

$T_A$, the ACK response time-out, is equal to the maximum round trip delay plus the maximum search and verification time of the synchronizer.

No diversity is considered

The probability of correct acquisition is evaluated in the presence of Rayleigh fading.

For the urban outdoor microcellular channel assumed here, the maximum excess delay $\tau_M$ at the chip rate of 1.2288 Mchips/sec is 13 chips [23]. That value of $\tau_M$ corresponds to the 22 dB drop of the multipath intensity profile. Therefore $\psi$=1/20 is used in the numerical analysis.

Figure 24:
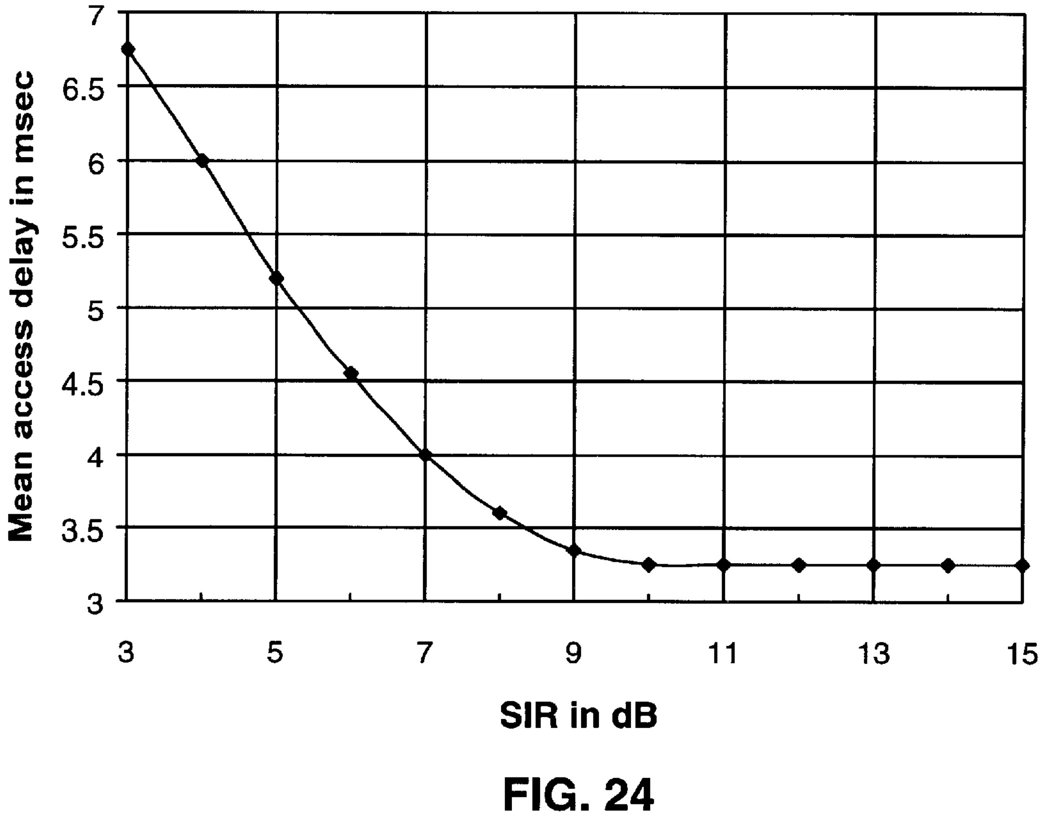
FIG. 24 is a graph showing mean access delay versus the initial ARM's SNR for the SDTX-MAC protocol.
Figure 25:
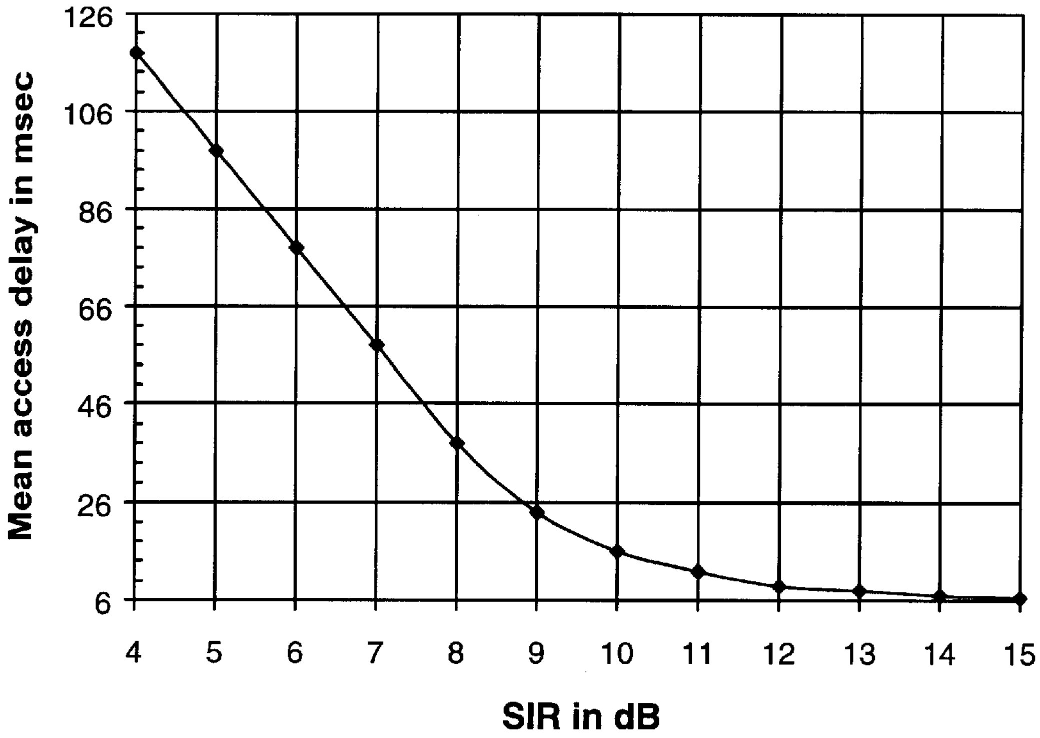
FIG. 25 is a graph showing mean access delay versus the initial ARM's SNR for the ADTX-MAC protocol.
Figure 26:
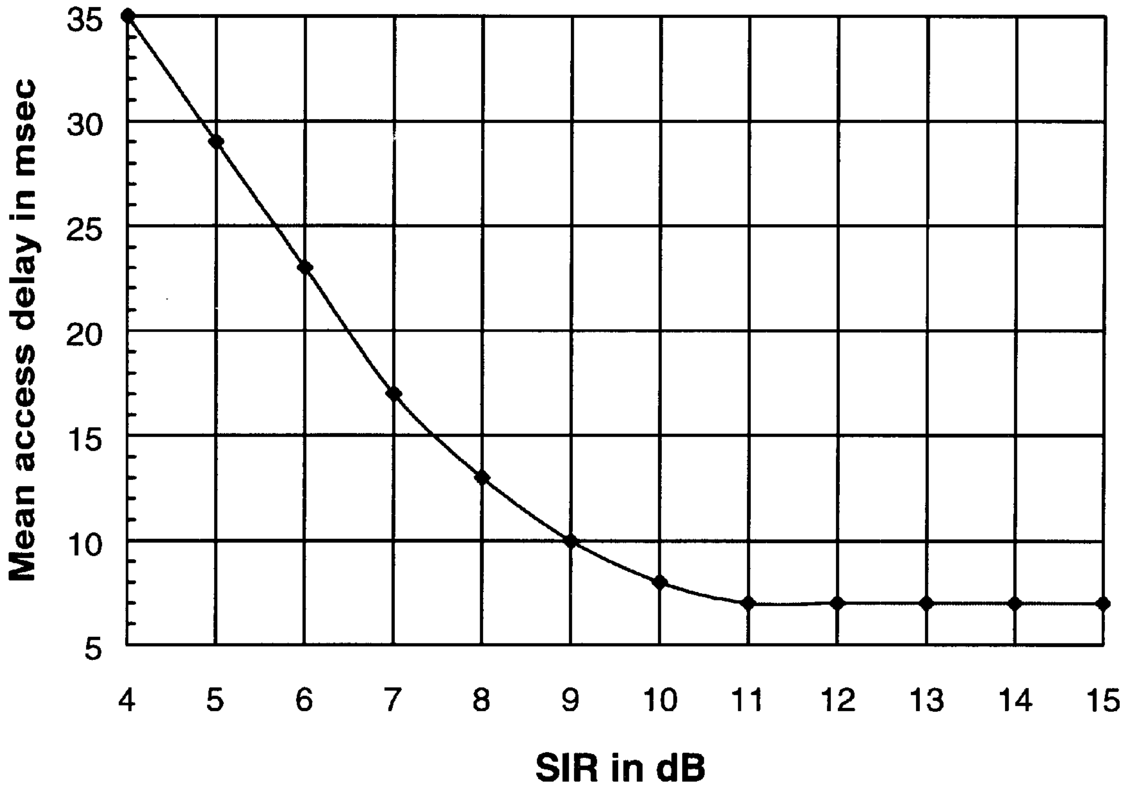
FIG. 26 is a graph showing mean access delay versus the initial ARM's SNR for ADTX-MAC protocol when the ID transmission is errorless.
Figure 27:
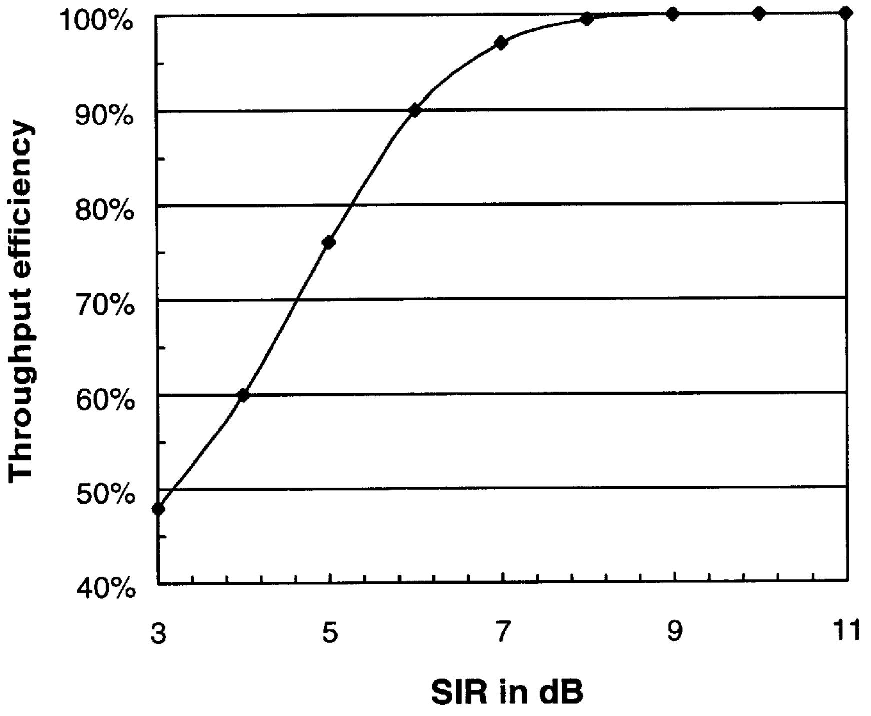
FIG. 27 is a graph showing throughput efficiency versus the initial ARM's SNR for SDTX-MAC protocol.
Figure 28:
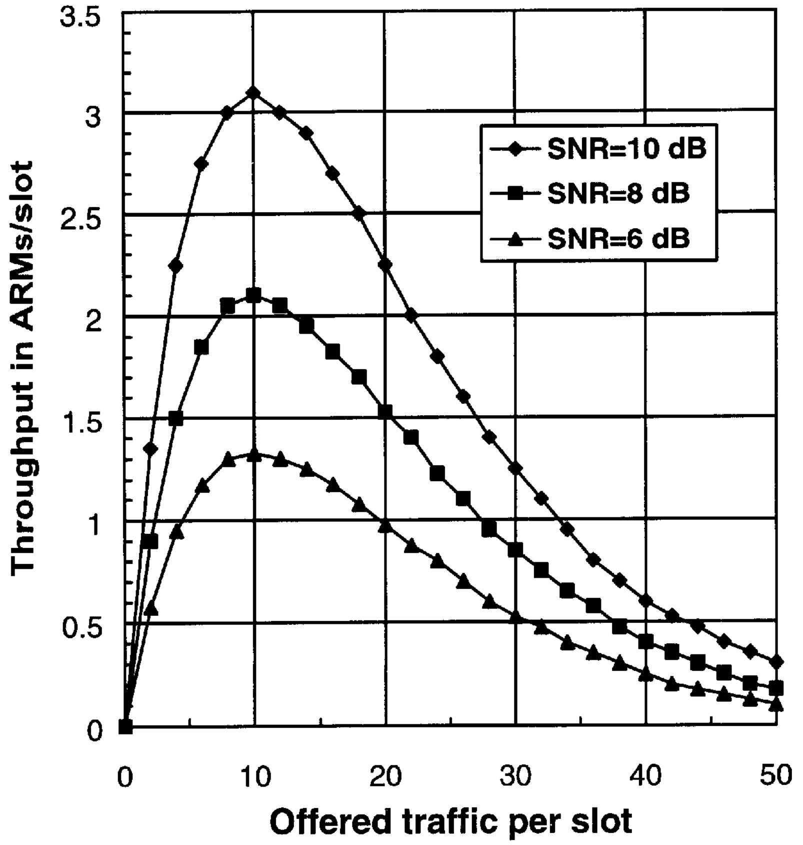
FIG. 28 is a graph showing throughput versus offered traffic for the ADTX-MAC protocol.

The mean access delays for both SDTX-MAC and ADTX-MAC protocols are shown in FIG. 24 and FIG. 25. From FIG. 25 it is observed that at low SIR, the mean access delay of ADTX-MAC is much larger. The reason is that, at the receiving end, the probability of a bit error of the ID message is high, which naturally leads to more retransmissions, and therefore longer access delay. The mean access delay for errorless ID transmission is shown in FIG. 26. In that case the access delay depends only on the performance of the dedicated synchronizer. The throughput for SDTX-MAC protocol is shown in FIG. 27. Note that the throughput for the SDTX-MAC may approach one, but can not exceed one even for an arbitrarily high signal to noise ratio. For the ADTX-MAC protocol, beyond a threshold value of the offered traffic which depends on the system parameters, the probability of collisions of access request messages from different users is very high. FIG. 28 shows the throughput curves for the ADTX-MAC scheme as a function of offered traffic at different signal to interference ratios of the initial ARM. It is seen that the ADTX-MAC scheme's throughput can be more than one per slot depending on the traffic, and the throughput increases approximately linearly before reaching its peak value.

The throughput for the M-SDTX-MAC scheme in ARMs per slot is up to around 0.2 $P_G$ at high SNRs. The curve of the mean access time for the M-SDTX-MAC scheme versus SNR is similar to that of the SDTX-MAC shown in FIG. 24.

The synchronous discontinuous transmission MAC (SDTX-MAC) protocol can provide delay characteristics superior to these of the asynchronous scheme (ADTX-MAC). One of the reasons is that ADTX-MAC is inherently unstable due to the possibility of collisions, and another is that ADTX-MAC's access request message must include a field indicating the identity of the mobile, for which the probability of error must be very low. The SDTX-MAC eliminates collisions between ARMs sent by different users, and does not require the mobile's identity to be transmitted in the ARM. Hence, the length of an ARM in SDTX-MAC is less than half of that in ADTX-MAC, and therefore its access delay is lower. As far as the throughput is concerned, when the offered traffic is low, ADTX-MAC may provide higher throughput than the SDTX-MAC, but when the offered traffic is high, the chance for an ARM being captured by the receiver using ADTX-MAC is slim. The proposed mini-slotted synchronous MAC combines advantages of both the SDTX and ADTX-MAC schemes. Its mean access delay depends on the number of minislots (or users) within each regular slot, but its throughput is much higher than that of either SDTX- or ADTX-MAC. For wideband CDMA systems which can support large number of users, the M-SDTX-MAC is preferred.

In M-SDTX-MAC, different codes in a CDMA system are not necessary to distinguish among different transmitters [5], [6]. The M-SDTX-MAC scheme not only takes advantage of the wideband nature of spread spectrum, but also solves the potential collision problem of the spread ALOHA multiple access (SAMA) method proposed in [5] and [6]. M-SDTX-MAC scheme constitutes a spread time division structure. Hence, the idea of the M-SDTX-MAC scheme is not limited to the application in medium access control. It can be used as a general multiple access method especially in CDMA/TDMA co-existence systems. In the mini-slotted synchronous multiple access scheme, all transmitters may be assigned the same spreading code, and therefore only a single matched filter or correlator is required in the receiver in order to receive all signals as explained in [5] and [6]. This feature greatly reduces the design complexity of base stations. On the other hand, system capacity with the mini-slotted synchronous discontinuous transmission multiple access method is comparable to that of the conventional CDMA system using a distinct spreading code for each user.

The proposed M-SDTX-MAC scheme may not only be used to transmit access request messages (ARMs) to gain access to dedicated packet data transmission channels in a cellular radio CDMA system, but also to actually transmit short packets in the same system. In that case the short data packets would be transmitted on the access channel using M-SDTX-MAC, and not on a separate data channel. ARMs would then not carry reservation messages, but would carry data. Each ARM would then contain a synchronizing pre-amble and a message part containing data. The synchronizing pre-amble would be the same as the ARM in the reservation scheme. In this case, the data packets are not true ARMs and may be referred to as short data packets. One disadvantage of such approach to transmission of short data packets would be a higher signal-to-interference-plus-noise requirement, due to the absence of closed loop power control on the short packet channel operating under the M-SDTX-MAC regime.

Immaterial modifications may be made to the invention described here without departing from the essence of the invention.

References

[1] TR45.5.0.18, "The CDMA2000 ITU-R RTT Candidate Submission", June 1998.

[2] A. Baier, "Open multi-rate radio interface architecture based on CDMA," in *Proc. ICUPC*'93, Ottawa, Canada, October 1993, pp. 985–989.

[3] TIA/EIA IS-95, "Mobile station—base station compatibility standard for dual-mode wideband spread spectrum cellular systems," *Telecommunications Industry Association*, 1993.

[4] N. Abramson, "The throughput of packet broadcasting channels", *IEEE Trans. Communications*, vol. COM-25, no. 1, January, 1977, pp. 117–128.

[5] N. Abramson, "Wideband random access for the last mile," *IEEE Personal Communications Magazine*, December 1996, pp. 29–33.

[6] N. Abramson, *Spread ALOHA CDMA Data Communications*, U.S. Pat. No. 5,537,397, Jul. 16, 1996.

[7] L. Kleinrock and F. A. Tobagi, "Packet switching in radio channels: Part I-Carrier sense multiple-access modes and their throughput-delay characteristics", *IEEE Trans. Communications*, COM-23, December 1975, pp. 1400–1416.

[8] S. B. Wicker, *Error Control Systems for Digital Communication and Storage*, Prentice-Hall, New Jersey, 1995.

[9] M. K. Simon, J. K. Omura, R. A. Scholtz, and B. K. Levitt, *Spread Spectrum Communications Handbooks*, revised edition, McGraw-Hill Inc., 1994.

[10] J. K. Holmes and C. C. Chen, "Acquisition time performance of PN spread spectrum systems", *IEEE Trans. Commun.*, COM-25, August 1977, pp. 778–783.

[11] A. Polydoros and C. L. Weber, "A unified approach to serial search spread spectrum code acquisition: Part I. General theory", *IEEE Trans. Commun.*, Vol. COM-32, May 1984, pp. 542–549.

[12] D. M. DiCarlo and C. L. Weber, "Statistical performance of single dwell serial synchronization systems", *IEEE Trans. Commun.*, COM-28, no. 8, August 1980, pp. 1382–1388.

[13] D. M. DiCarlo, Multiple dwell serial synchronization of pseudonoise signals, Ph.D. Dissertation, Department of Electrical Engineering, University of Southern California, May 1979.

[14] D. M. DiCarlo and C. L. Weber, "Multiple dwell serial search: Performance and application to direct sequence code acquisition", *IEEE Trans. Commun.*, COM-31, no. 5, May 1983, pp. 650–659.

[15] R. L. Peterson, R. E. Ziemer and D. E. Borth, *Introduction to Spread Spectrum Communications*, Prentice-Hall, New Jersey, 1995.

[16] A. Polydoros and C. L. Weber, "A unified approach to serial search spread spectrum code acquisition: Part II. A matched filter receiver", *IEEE Trans. Commun.*, Vol. COM-32, May 1984, pp. 550–560.

[17] A. J. Viterbi, *CDMA: Principles of Spread Spectrum Communication*, Addison-Wesley, 1995.

[18] W.-C. Lin, K.-C. Liu and C.-K. Wang, "Differential matched filter architecture for spread spectrum communication systems," *Electron. Letters*, Vol.32 No. 17, August 1996.

[19] J. G. Proakis, *Digital Communications*, 3rd edition, McGraw-Hill, New York, 1995.

[20] S. Sun and W. A. Krzymien, "Matched filter based synchronizer design for rapid synchronization of packet data transmissions in DS-CDMA personal communications systems," in *Proc. PACRIM'*97, Victoria, Canada, August 1997, pp. 5–8.

[21] L. G. Roberts, "ALOHA packet system with and without slots and capture", *Comput. Comma Rev.*, vol. 5, pp. 28–42, April 1975.

[22] A. Leon-Garcia, *Probability and Random Processes for Electrical Engineering*, Addison-Wesley, Reading, Mass., 1994.

[23] JTC(AIR)/93.09.23-238R2, "Report on RF channel characterization," Sep. 23, 1993, p. 20.

[24] S. Sun, W. Krzymien, A. Jalali and Q. Shen, "Performance comparison of two medium access control schemes for packet data traffic in DS-CDMA personal communications systems", *Proc. of IEEE Globecom'*97/CTMC'97, Phoenix, USA, November 1997, pp. 185–189.

[25] Chris Scholefield, "Evolving GSM data services", *Proc. of IEEE ICUPC'*97, San Diego, October 1997, pp. 888–892.

The embodiments of the invention in which an exclusive property or privilege is claimed are defined as follows:

1. A method of transmitting access request messages (ARMs) to gain access to packet data transmission channels in a cellular radio CDMA system, the method comprising the steps of:

transmitting ARMs from multiple terminals as overlapping packets, where each identical packet contains several repetitions of an identical spreading sequence for each terminal; the ARMs corresponding to different terminals being arranged into frames;

allocating a respective mini-slot in each frame to a particular terminal as an initial synchronization and identification reference for an ARM transmitted from the particular terminal; each ARM being longer than its associated mini-slot, but the beginning of the ARM being inside the mini-slot; and at each terminal, beginning to transmit data from the terminal after a base station allocates to it a packet data transmission channel upon successful receipt of an ARM.

2. The method of claim 1 in which each mini-slot is sufficiently long to avoid a collision between ARMs sent from different terminals.

3. The method of claim 2 in which the ARM is transmitted over a radio channel within a cell, the channel has a cell-size dependent propagation delay and a maximum excess delay, and each mini-slot has a length at least equal to twice the maximum expected propagation delay plus maximum excess delay plus guard time.

4. The method of claim 3 in which the mini-slot allocated to a terminal is allocated upon registration of the terminal in the CDMA system.

5. The method of claim 2 in which the mini-slot allocated to a terminal is allocated upon registration of the terminal in the CDMA system.

6. The method of claim 1 in which the mini-slot allocated to a terminal is allocated upon registration of the terminal in the CDMA system.

7. A method of transmitting data in a telecommunications system, the method comprising the steps of:

transmitting data from multiple terminals in data packets, in which the data is spread with an identical spreading sequence for each terminal, the data packets being transmitted in synchronized frames;

allocating a respective mini-slot in each frame to a particular terminal as a synchronization reference for a data packet transmitted from the particular terminal in a respective time slot; and at each terminal, transmitting data packets from the terminal beginning at a time within the mini-slot allocated to that terminal, with the data packet being longer than the mini-slot.

8. The method of claim 7 in which each mini-slot has a length sufficiently long to avoid a collision between data packets sent from different terminals.

9. The method of claim 8 in which the mini-slot allocated to a terminal is allocated upon registration of the terminal in a telecommunications system.

10. The method of claim 8 in which the telecommunications system is a CDMA system.

11. The method of claim 7 in which the data is transmitted within a cell over a radio channel, the channel has a cell-size dependent maximum propagation delay and a maximum excess delay, and each mini-slot has a length at least equal to twice the maximum propagation delay plus maximum excess delay plus some guard time.

12. The method of claim 11 in which the mini-slot allocated to a terminal is allocated upon registration of the terminal in a telecommunications system.

13. The method of claim 11 in which the telecommunications system is a CDMA system.

14. The method of claim 7 in which the mini-slot allocated to a terminal is allocated upon registration of the terminal in a telecommunications system.

15. The method of claim 7 in which the data packets comprise access request messages.

16. The method of claim 7 in which the telecommunications system is a CDMA system.

17. A method of transmitting packets in a telecommunications system, the method comprising the steps of:

transmitting packets from multiple terminals, in which the packets are spread with an identical spreading sequence for each terminal, the packets being transmitted in synchronized frames;

allocating a respective mini-slot in each frame to a particular terminal as a synchronization reference for a packet transmitted from the particular terminal in a respective time slot; and at each terminal, transmitting packets from the terminal beginning at a time within the mini-slot allocated to that terminal, with the packet being longer than the mini-slot.

18. The method of claim 17 in which each mini-slot has a length sufficiently long to avoid a collision between data packets sent from different terminals.

19. The method of claim 17 in which the data is transmitted within a cell over a radio channel, the channel has a cell-size dependent maximum propagation delay and a maximum excess delay, and each mini-slot has a length at least equal to twice the maximum propagation delay plus maximum excess delay plus some guard time.

20. The method of claim 17 in which the mini-slot allocated to a terminal is allocated upon registration of the terminal in a telecommunications system.

* * * * *